(12) United States Patent
Hawkins

(10) Patent No.: US 10,346,498 B2
(45) Date of Patent: Jul. 9, 2019

(54) PRESENTING AND INTERACTING WITH A HYPERLINK DIALOG FOR GENERATING HYPERLINKS

(75) Inventor: Quinn Patrick Hawkins, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 585 days.

(21) Appl. No.: 13/366,383

(22) Filed: Feb. 6, 2012

(65) Prior Publication Data

US 2013/0205187 A1 Aug. 8, 2013

(51) Int. Cl.
*G06F 17/21* (2006.01)
*G06F 16/955* (2019.01)

(52) U.S. Cl.
CPC .......... *G06F 16/9558* (2019.01); *G06F 17/21* (2013.01)

(58) Field of Classification Search
CPC ............... G06F 17/2235; G06F 3/0482; G06F 3/04842; G06F 17/211; G06F 17/22; G06F 17/21
USPC ................................ 715/206, 208, 724, 770
See application file for complete search history.

(56) References Cited

U.S. PATENT DOCUMENTS

| | | | |
|---|---|---|---|
| 5,983,245 A * | 11/1999 | Newman | G06F 17/2235 715/205 |
| 6,233,591 B1 * | 5/2001 | Sherman et al. | 715/205 |
| 6,338,059 B1 | 1/2002 | Fields et al. | |
| 6,544,295 B1 * | 4/2003 | Bodnar | G06F 17/30884 707/E17.114 |
| 6,628,311 B1 * | 9/2003 | Fang | 715/777 |
| 6,948,135 B1 | 9/2005 | Ruthfield et al. | |
| 7,496,559 B2 | 2/2009 | Gross et al. | |
| 7,788,590 B2 | 8/2010 | Taboada et al. | |
| 7,831,547 B2 | 11/2010 | Epling et al. | |
| 7,855,811 B2 | 12/2010 | Silverbrook et al. | |
| 2004/0093562 A1 * | 5/2004 | Diorio | G06F 17/30873 715/205 |
| 2004/0135805 A1 * | 7/2004 | Gottsacker et al. | 345/751 |
| 2006/0026145 A1 | 2/2006 | Beringer et al. | |
| 2006/0026534 A1 | 2/2006 | Ruthfield et al. | |
| 2007/0174286 A1 | 7/2007 | Seitz et al. | |

(Continued)

OTHER PUBLICATIONS

Microsoft® Word 2007 Bible, by: Herb Tyson, Publisher: John Wiley & Sons, Pub. Date: Mar. 12, 2007, pp. 609-622.*

(Continued)

*Primary Examiner* — Kavita Padmanabhan
*Assistant Examiner* — Tionna M Burke
(74) *Attorney, Agent, or Firm* — Michael Best & Friedrich LLP

(57) ABSTRACT

Concepts and technologies are described herein for presenting and interacting with a hyperlink dialog. In accordance with the concepts and technologies disclosed herein, a hyperlink module can present a hyperlink dialog and can obtain hyperlink data that corresponds to user interactions with the hyperlink dialog. The hyperlink module can be configured to populate the hyperlink dialog with clipboard data, application data, web data, and/or other data. The hyperlink dialog can include a number of pages or tabs for identifying, selecting, and/or otherwise specifying a resource to be referenced by a hyperlink. Hyperlink data corresponding to the specified hyperlink can be output by the hyperlink module and stored or used for various purposes.

20 Claims, 15 Drawing Sheets

(56) References Cited

U.S. PATENT DOCUMENTS

| | | | |
|---|---|---|---|
| 2007/0192716 A1* | 8/2007 | Hamada | G06F 17/24 715/764 |
| 2008/0313206 A1* | 12/2008 | Kordun et al. | 707/102 |
| 2012/0216124 A1* | 8/2012 | Martino | H04L 65/1069 715/739 |

OTHER PUBLICATIONS

"1-Click Answers", Retrieved at <<http://www.answers.com/main/download_answers_win.jsp>>, Retrieved Date: Nov. 17, 2011, pp. 3.

* cited by examiner

PRESENTING AND INTERACTING WITH A HYPERLINK DIALOG FOR GENERATING HYPERLINKS

BACKGROUND

Users interacting with various application programs sometimes create hyperlinks for linking text or other information in files with external information or resources such as web sites, web pages, other files, and/or other information. The ability to insert hyperlinks into documents can enhance the reader's experience in interacting with and/or reviewing the documents by enabling the reader to easily and quickly access external information referenced by the hyperlinks.

Users wishing to insert hyperlinks in a particular application program can be presented with a user interface for creating the hyperlinks in that application program. A user can type the address or other identifier for a resource the user wishes to link to via the hyperlink. Alternatively, the user may use other application programs such as a web browser to determine the text for the hyperlink, copy that text, and then paste the text into the user interface for creating the hyperlink.

Although hyperlinks sometimes are inserted into word processing documents, mail items, or other text-based files, the linked information may be associated with other application programs such as a web browser. Thus, users may switch between various application programs to identify text for a hyperlink and/or to copy that text into a user interface for creating the hyperlinks. Switching between multiple programs to find information for inclusion in a hyperlink can be time consuming and/or confusing.

It is with respect to these and other considerations that the disclosure made herein is presented.

SUMMARY

Concepts and technologies are described herein for presenting and interacting with a hyperlink dialog. In accordance with the concepts and technologies disclosed herein, a user device can be configured to execute a hyperlink module for presenting a hyperlink dialog and for obtaining data corresponding to interactions with the hyperlink dialog. The hyperlink module can be configured to populate the hyperlink dialog with data obtained from various sources including, but not limited to, clipboard data stored at or accessible by the user device, data selected within an application program executing at the user device ("selected data"), and/or application data associated with one or more application programs executing at the user device. In some embodiments, the hyperlink module also can populate the hyperlink dialog with information obtained from external sources such as web data obtained from a web server or other sources.

The hyperlink dialog can include a number of pages or tabs. As used herein, a "tab" can include a user interface or a portion thereof for providing a particular type or category of information and/or supporting a particular type or category of interactions. The tabs presented by the hyperlink dialog can include, for example, a quick type tab for typing in a path, a filename, an address, a locator, and/or another type of identifier for identifying a resource; an open tabs page or tab for viewing and/or selecting one or more resources open in an application program window or tab; a history tab for viewing and/or selecting one or more visited sites, pages, applications, files, or other resources; a favorites tab for viewing and/or selecting one or more frequently-visited resources and/or resources explicitly added to a favorites file; a search tab such as a web search tab for searching for one or more resources on the Internet of other networks or locations; other tabs; or the like. As used herein, the term "resource" can refer to a web page, a web site, a web or native application, a file or folder, an extension or applet, or other data or information.

Users can select and interact with the tabs to select a resource or resource location that the user wishes to associate with a hyperlink. In some embodiments, text or fields can be populated by the hyperlink module based upon data stored in a clipboard or other data storage. The text or fields also can be populated based upon application data that reflects data or resources being interacted with using various application programs executing at the user device or otherwise associated with the user device. The user can specify the resource and enter a command to generate the hyperlink. Hyperlink data corresponding to the specified hyperlink can be stored or otherwise used at the user device or elsewhere.

According to one aspect, a user device executes application programs and a hyperlink module. The hyperlink module can be configured to present a hyperlink dialog having multiple tabs. The tabs can include various fields, user interface controls, and/or other mechanisms for identifying, selecting, and/or otherwise specifying information to be referenced by a hyperlink. Users can select a tab and input commands for selecting or specifying the information to be referenced by the hyperlink.

According to another aspect, the hyperlink module can populate some or all of the tabs or elements thereof with clipboard data associated with the user device, selected data, and/or application data associated with one or more application programs. The clipboard data and/or the selected data can be used, for example, to generate a search query, to populate an address field or bar, or for other purposes. The application data can be used, for example, to populate open tabs pages or tabs, history tabs, or other tabs or elements thereof. User interactions with the tabs can be used to generate the hyperlinks and/or hyperlink data that is output by the hyperlink module for various purposes.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
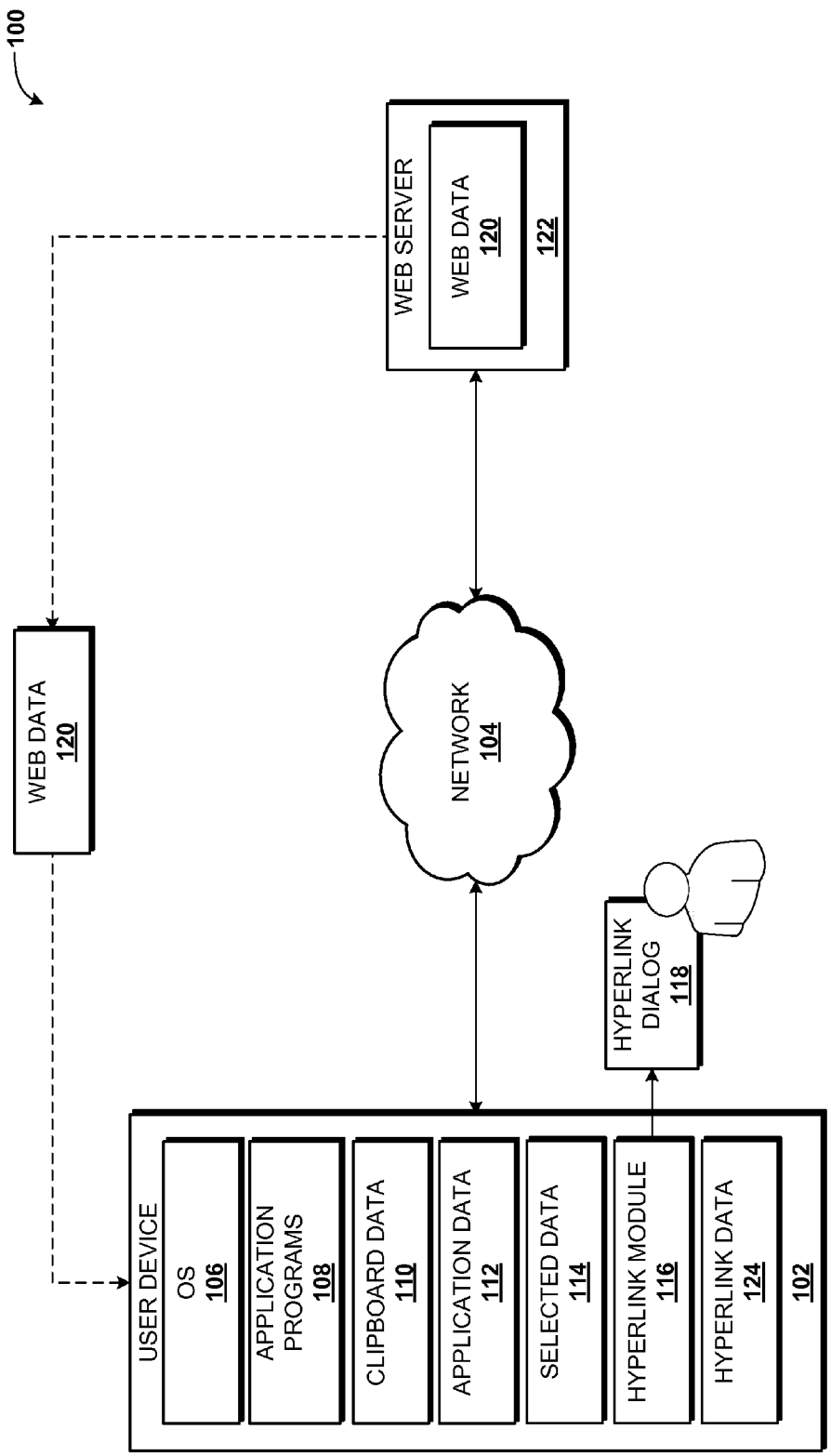
FIG. 1 is a system diagram illustrating an illustrative operating environment for the various embodiments disclosed herein.

The following detailed description is directed to concepts and technologies for presenting and interacting with a hyperlink dialog. According to the concepts and technologies described herein, a user device can be configured to execute a hyperlink module for presenting a hyperlink dialog and for obtaining hyperlink data that corresponds to user interactions with the hyperlink dialog. The hyperlink module can be configured to populate the hyperlink dialog with data obtained from various sources including, but not limited to, clipboard data stored at or accessible by the user device, data selected within an application program executing at the user device ("selected data"), application data associated with one or more application programs executing at or otherwise associated with the user device, and/or external sources such as web data obtained from a web server or other source.

The hyperlink dialog can include a number of pages or tabs for identifying, selecting, and/or otherwise specifying a resource that is to be referenced by a hyperlink. Users can select and interact with the tabs to select a resource or resource location that the user wishes to associate with a hyperlink. In some embodiments, text or fields within the tabs or pages can be populated by the hyperlink module based upon data stored in a clipboard or other data storage and/or based upon application data that reflects data or resources being interacted with by the application programs. The user can specify the resource and enter a command to generate the hyperlink. Hyperlink data corresponding to the specified hyperlink can be stored or used at the user device or elsewhere.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for presenting and interacting with a hyperlink dialog will be presented.

Referring now to FIG. 1, aspects of one operating environment 100 for the various embodiments presented herein will be described. The operating environment 100 shown in FIG. 1 includes a user device 102. In some embodiments, the user device 102 operates as part of, or in communication with, a communications network ("network") 104, though this is not necessarily the case. In particular, in some embodiments the user device 102 operates without connecting to other devices, networks, or other systems. As such, the illustrated embodiment is illustrative and should not be construed as being limiting in any way.

According to various embodiments, the functionality of the user device 102 is provided by a personal computer ("PC") such as a desktop, tablet, or laptop computer system. In other embodiments, the functionality of the user device 102 is provided by other types of computing systems including, but not limited to, a handheld computer, a netbook computer, an embedded computer system, a personal digital assistant ("PDA"), a mobile telephone, a smart phone, or another computing device. Thus, while the functionality of the user device 102 is described herein as being provided by a PC or tablet device, it should be understood that these embodiments are illustrative, and should not be construed as being limiting in any way. Some illustrative embodiments of the user device 102 are illustrated and described in additional detail below with reference to FIGS. 4-6.

The user device 102 can be configured to execute an operating system 106 and one or more application programs 108. The operating system 106 is a computer program for controlling the operation of the user device 102. The application programs 108 are executable programs configured to execute on top of the operating system to provide various functions. According to various implementations, the application programs 108 include, but are not limited to, web browsers, office productivity applications, stand-alone applications, multimedia software, other applications, and the like. In various examples described herein, the application programs 108 include a web browser application such as, for example, a member of the MICROSOFT INTERNET EXPLORER family of web browsers from Microsoft Corporation in Redmond, Wash. It should be understood that this embodiment is illustrative, and should not be construed as being limiting in any way.

The web browser or other application programs 108 can be configured to support a "copy" function that allows users to copy data ("clipboard data") 110 to a clipboard or otherwise store the clipboard data 110 in memory. The clipboard data 110 can be used for various purposes such as, for example, pasting or copying the clipboard data 110 into other documents or files, saving the clipboard data 110 as a file, and/or for other purposes. Although not shown in FIG. 1, the user device 102 also can be configured to store the clipboard data 110 in a network clipboard or other remote data storage device. Because local and remote clipboards are generally known, the storage of the clipboard data 110 in a clipboard and the retrieval and/or use of the clipboard data 110 are not illustrated or described in additional detail herein.

The application programs 108 also can store and/or interact with data used by or associated with the application programs ("application data") 112. The application data 112 can indicate states and/or operations occurring with respect to the application programs 108, user settings and/or activities with the application programs 108, data displayed and/or used by the application programs 108, or the like. For example, the application data 112 can reflect one or more open tabs in a web browser, one or more open windows in a word processing application, one or more messages open in a mail application, and/or other documents, files, or datasets open in other types of applications. Because the application data 112 can include various data used by or generated by the application programs 108, it should be understood that the above examples of the application data 112 are illustrative, and should not be construed as being limiting in any way.

The application programs 108 also can be configured to support selection of text, images, tables, objects, or other data ("selected data") 114 within the application programs 108. The selected data 114 can be used for various purposes such as, for example, indicating text, images, objects, or other data with which a hyperlink is to be associated, indicating text to copy to a clipboard or other data storage, or other purposes. Additionally, as will be described in more detail below, the selected data 114 can be used to generate search terms and/or addresses used to create hyperlinks. These and other aspects of the selected data 114 are discussed in more detail below with reference to FIGS. 2A-3I.

The user device 102 also can be configured to store computer-executable instructions for providing a hyperlink module 116. The hyperlink module 116, as will be described in detail herein, can be configured to present a user interface for generating a hyperlink dialog 118. The hyperlink dialog 118 can include various options, form elements, and/or other functionality for generating a hyperlink by typing in or otherwise entering text, or by selecting favorites, bookmarks, visited sites, open tabs or windows, search results, or other resources and associating the selected resources with the hyperlink.

The hyperlink module 116 can generate the hyperlink dialog 118 and can populate one or more tabs or pages of the hyperlink dialog 118 with various data. The terms "tab" and/or "page," as used herein, can refer to a user interface or a portion thereof for providing a particular type or category of information in a the hyperlink dialog 118 and/or a particular type or category of interactions that are enabled or supported by the hyperlink dialog 118. In some embodiments, the hyperlink module 116 populates the hyperlink dialog 118 with clipboard data 110, the application data 112, the selected data 114, and/or web data 120, which can be obtained from a web server 122 in communication with the user device 102. As noted above, the web server 122 can be omitted in some embodiments, and therefore the web data 120 may or may not be used to populate the hyperlink dialog 118. According to various embodiments, the hyperlink dialog 118 includes several tabs or pages such as, for example, a quick type tab, an open tabs page or tab, a history tab, a favorites tab, a web search tab, and/or other tabs or pages. These and other tabs of the hyperlink dialog 118 are described in additional detail below with reference to FIGS. 2A-3I. Additional and/or alternative tabs are contemplated, and as such, these and other tabs described herein are illustrative and should not be construed as being limiting in any way.

The hyperlink module 116 can present the hyperlink dialog 118 to a user or other entity ("user") and can receive input from the user for navigating to or between the presented tabs, receiving text or other input for the hyperlinks, receiving search queries and/or result selections, and/or other input. The hyperlink module 116 also can be configured to use the clipboard data 110, the application data 112, and/or the selected data 114 to populate the hyperlink dialog 118. For example, the hyperlink module 116 can populate some of the tabs with the clipboard data 110. In one contemplated embodiment, the hyperlink module 116 can be configured to search the clipboard data 110 for any links, paths, or other identifiers upon loading the hyperlink dialog 118, and to populate a quick type tab with the link, path, or other identifier if recognized in the clipboard data 110. Similarly, the hyperlink module 116 can use selected text or other example of the selected data 114 populate the quick type tab or a search tab, and/or to specify a search query. These and other aspects of using clipboard data 110 or selected data 114 to populate tabs or pages of the hyperlink dialog 118 are illustrated and described in more detail below, particularly with reference to FIGS. 2A-3I.

The hyperlink module 116 also can use the application data 112 to populate the hyperlink dialog 118. For example, the hyperlink module 116 can identify open tabs associated with one or more web browser applications executing at the user device 102 or elsewhere, a history file associated with the one or more web browser applications, recently visited files or applications, a favorites and/or bookmarks file associated with the web browser application, and/or other data associated with one or more of the application programs 108. Some example embodiments of using the application data 112 to populate the hyperlink dialog 118 are illustrated and described below in more detail with reference to FIGS. 3A-3I.

The hyperlink module 116 can generate hyperlink data 124 that corresponds to one or more hyperlinks generated via the hyperlink module 116. The hyperlink module 116 can generate the hyperlink data 124, for example, upon receiving a command to close the hyperlink dialog 118, upon receiving input to generate a hyperlink based upon data input in the hyperlink dialog 118, and/or in response to other actions or user activities. The hyperlink data 124 can include data stored in various formats. Thus, the hyperlink data 124 can be stored in various formats depending upon the application program 108 in which the hyperlink data 124 is to be used, the operating system 106 executed by the user device 102, a format supported by a web application interacted with by the user device 102, or based upon other considerations.

In some embodiments, the hyperlinks created via the hyperlink module 116 are based, at least partially, upon the web data 120 obtained from the web server 122. In particular, in some embodiments a user enters text and/or selects an open a visited site, a favorite, or a search result for the hyperlink. The user device 102 can be configured to obtain, from the web server 122, the web data 120, and to determine the title of the hyperlink and/or other aspects of the hyperlink based, at least partially, upon the web data 120. In one contemplated embodiment, the web data 120 is analyzed by the hyperlink module 116 to identify a title of the resource to be referenced by the hyperlink. The title can correspond, in some instances, to a title for the page, site, application, file, or other resource identified by the hyperlink, instead of, or in addition to, the URL or other identifier of the resource.

In one contemplated example, a user can generate a hyperlink for driving directions using the BING search engine from Microsoft Corporation. In this example, a URL for the driving directions can include the address "http://www.bing.com/maps/," as well as other text that may relate to specific addresses, ZIP codes, cities, street numbers, or the like, as well as session ID information, referrer page information, and/or other data. Entering the URL into a document may be confusing to a user and/or may include unnecessary information. Embodiments of the hyperlink module 116 therefore can be configured to use the title of the web page instead of, or in addition to, the full URL that can be included in the hyperlink. In the above example, a lengthy URL may be replaced by a title such as, for example, "BING Maps." If a user selects text in a document or other file, the URL can be associated with that text instead of, or in addition to, obtaining the title as explained above. As such, it should be understood that this embodiment is illustrative, and should not be construed as being limiting in any way.

The hyperlink data 124 can be stored at the user device 102 and/or used or consumed by the application programs 108. Thus, for example, the hyperlink data 124 generated using the hyperlink module 116 can be saved in a document, mail message, web page, or other file. The hyperlink data 124 also can be shared with other devices or programs and used at locations remote from the user device 102, if desired. Thus, the user device 102 can be used to provide a hyperlink service for other devices or networks, as will be explained in more detail below with reference to FIG. 5.

Generally, a user or other entity can launch the hyperlink dialog 118 from within execution of one or more of the application programs 108, by calling the hyperlink module 116, by launching the hyperlink dialog 118 directly, or by an application call. The hyperlink dialog 118 can include a number of tabs or pages that can be used to generate hyperlinks. In addition to a quick type tab, a user can access various tabs for selecting open tabs or windows, history files, favorites, web search pages, recently viewed or used files, or other resources, any of which can be used to specify resources referenced by hyperlinks.

The various tabs or pages of the hyperlink dialog 118 can be populated with the clipboard data 110, the selected data 114, the application data 112, and/or the web data 120. Users or other entities can interact with the hyperlink dialog 118 to generate the hyperlinks and the hyperlink module 116 can generate and/or store hyperlink data 124 associated with the generated hyperlinks. The hyperlink data 124 can be stored by the user device 102 or remotely, and/or can be used or consumed by the application programs 108. These and other aspects of the concepts and technologies disclosed herein for presenting and interacting with a hyperlink dialog 118 are illustrated and described in more detail below.

FIG. 1 illustrates one user device 102, one network 104, and one web server 122. It should be understood, however, that some implementations of the operating environment 100 include multiple user devices 102, multiple networks 104, and no or multiple web servers 122. Thus, the illustrated embodiments should be understood as being illustrative, and should not be construed as being limiting in any way.

Figure 2A:
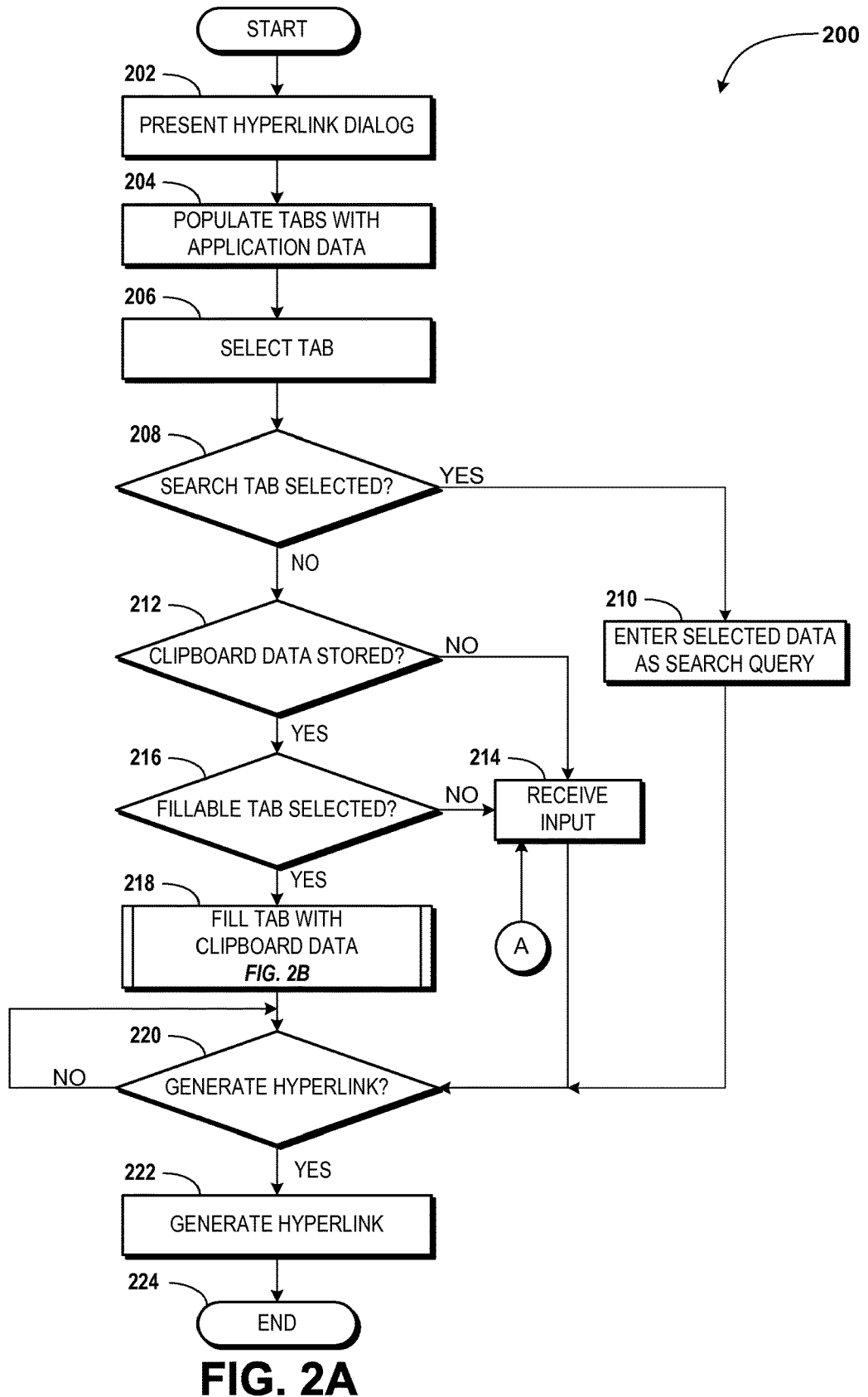
FIGS. 2A-2B are flow diagrams showing aspects of a method for presenting and interacting with a hyperlink dialog, according to an illustrative embodiment.
Figure 2B:
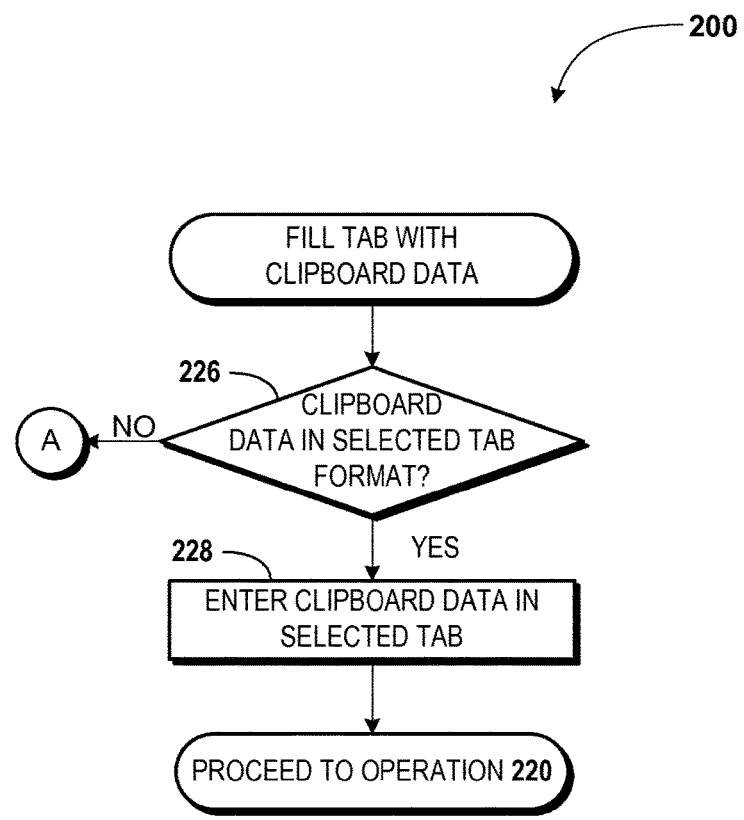

Turning now to FIGS. 2A-2B, aspects of a method 200 for presenting and interacting with a hyperlink dialog 118 will be described in detail. It should be understood that the operations of the method 200 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 disclosed herein is described as being performed by the user device 102 via execution of the hyperlink module 116. It should be understood that these embodiments are illustrative, and should not be viewed as being limiting in any way. In particular, additional or alternative devices can provide the functionality described herein with respect to the method 200 via execution of various application programs in addition to, or instead of, the hyperlink module 116.

The method 200 begins at operation 202, wherein the user device 102 presents a hyperlink dialog 118. The hyperlink dialog 118 can include a user interface window, an application window, or fields or options within a user interface window, an application window, or elsewhere on a screen display. Various illustrative examples of the hyperlink dialog 118 are illustrated and described below with reference to FIGS. 3A-3I. As explained above, the hyperlink dialog 118 can include a number of tabs or pages.

From operation 202, the method 200 proceeds to operation 204, wherein the user device 102 can populate the tabs or pages of the hyperlink dialog 118. In some embodiments, the user device 102 populates one or more of the tabs with the application data 112. For example, the user device 102 can populate a history tab with visited sites, files, applications, pages, or other resources identified in a history file. Similarly, an open tabs page or a favorites page can be populated with the application data 112. Additional and/or alternative types of information that can be used to populate the tabs of the hyperlink dialog 118 are illustrated and described in more detail below with reference to FIGS. 3A-3I.

From operation 204, the method 200 proceeds to operation 206, wherein the user device 102 selects a tab. As explained herein, a "tab" can include a page, tab, or other portion of a user interface. According to various embodiments of the concepts and technologies disclosed herein, the hyperlink dialog 118 includes a number of tabs to access various features of the hyperlink module 116. Some of the contemplated tabs are illustrated below in detail with reference to FIGS. 3A-3I. Briefly, the hyperlink dialog 118 can include a quick type tab for entering a path, a resource locator or identifier, or other text for identifying a resource; an open tabs page or tab for selecting an open tab in a web browser application associated with the user device; a history tab for accessing visited sites or other resources; a favorites tab for accessing sites or other resources indicated as favorites; a web search tab for searching for a resource and designating a path, locator, or identifier associated with the resource; and/or other tabs or pages.

In some embodiments, the hyperlink module 116 is configured to present the hyperlink dialog 118 with a default tab selected. For example, in some embodiments the hyperlink dialog 118 is loaded with the quick type tab selected by default, the web search tab selected by default, or other tabs selected by default. A user or other entity ("user") can select a tab in the hyperlink dialog 118, as will be more clearly understood with reference to FIGS. 3A-3I below. Thus, operation 206 can include selecting a tab by default and/or receiving a selection of a tab before, after, or during loading of the hyperlink dialog 118.

From operation 206, the method 200 proceeds to operation 208. At operation 208, the user device 102 can determine if a web search tab is selected. In other words, the user device 102 can determine if the tab selected in operation 206 corresponds to a web search tab or other search tab. If the user device 102 determines, in operation 208, that the web search tab is selected, the method 200 can proceed to operation 210, wherein the user device 102 can populate the web search tab with the selected text in the application 110 such as the selected text 114 described above with reference to FIG. 1. As such, in operation 208, the user device 102 can identify text selected in a document or other file and use that text to generate the search query. Thus, if a user selects a phrase or word in a document and selects an option to generate a hyperlink, for example by entering the "ctrl+k" keyboard shortcut, the user device 102 can copy that text, the selected text 114, to memory and load the text into the web search tab as the search query.

In one contemplated example, a user may select text such as "Microsoft Windows 8" as the selected text 114, as explained above. In this example, if the user loads the hyperlink dialog 118 and selects the web search tab or other search tab, the user device 102 can populate the web search tab with the selected text 114, in this example the text "Microsoft Windows 8," and execute a search using this text as the query automatically or upon selection of an option to execute the search. This example is illustrated and described in more detail below with reference to FIGS. 3F-3I. It should be understood that this embodiment is illustrative, and should not be construed as being limiting in any way. If the user device 102 determines, in operation 208, that the web search tab is not selected, the method 200 can proceed to operation 212.

In operation 212, the user device 102 determines if the clipboard data 110 is stored at the user device 102. As is generally understood, users or other entities can save data to a clipboard or other data storage mechanism. For example, text, images, video, or other data can be selected and copied, via the "copy" command or a keyboard shortcut such as the "ctrl+c" keystroke command. Thus, operation 212 can include determining if data is stored to a clipboard or other data storage associated with the user device 102.

In other contemplated embodiments, the user device 102 can access a shared clipboard or other shared data repository to determine if the clipboard data 110 is stored. Thus, for example, users or other entities can save data to a network clipboard or other shared clipboard via various devices such as mobile phones, server computers, workstations, personal computers, or the like, or can save data at the user device 102. As such, operation 212 can include determining if the clipboard data 110 is stored at the user device 102 and/or if the clipboard data 110 is stored at a data storage device or location associated with the user device 102.

If the user device determines, in operation 212, that the clipboard data 110 is not stored, the method 200 proceeds to operation 214. At operation 214, the user device 102 can receive input for populating or filling the tab selected in operation 206. Thus, for example, if a favorites tab is presented, operation 214 can include waiting for a user to select or otherwise indicate a favorite to use as the hyperlink. These and other aspects of receiving input as shown in operation 214 are illustrated and described in additional detail with reference to FIGS. 3A-3I.

If the user device 102 determines, in operation 212, that the clipboard data 110 is stored, the method 200 proceeds to operation 216. At operation 216, the user device 102 determines if a finable tab is selected. Some tabs or pages of the hyperlink dialog 118 can be referred to as "fillable" if the tab or page is configured to automatically populate a field or other user interface element with the clipboard data 110. In the example user interfaces illustrated and described in FIGS. 3A-3I, the quick type tab and the web search tab are configured as finable tabs. Thus, the clipboard data 110 can be used to populate these tabs. Thus, operation 216 can include determining if the quick type tab or the web search tab is the tab selected in operation 206. Because other tabs can be configured to be finable. It should be understood that this embodiment is illustrative, and should not be construed as being limiting in any way.

If the user device 102 determines, in operation 216, that a fillable tab is not selected, the method 200 can again proceed to operation 214, wherein the user device 102 can receive input for populating the tab selected in operation 206. If the user device 102 determines, in operation 216, that the fillable tab is selected, the method 200 proceeds to operation 218. At operation 218, the user device 102 populates the tab selected in operation 206 with the clipboard data 110. The filling of the fillable tab as shown in operation 218 will be explained in more detail below with reference to FIG. 2B.

From operations 214 and 218, the method 200 proceeds to operation 220. In operation 220, the user device 102 determines if a command to generate the hyperlink is received. The command to generate the hyperlink can be received, for example, via, receiving a command to exit the hyperlink dialog 118, via selection of an "okay," "accept," or other option in the hyperlink dialog 118, via voice or keystroke commands such as an "okay" voice command or a "enter" keystroke, and/or other input or actions. Some example input for generating the hyperlink are illustrated and described below with reference to FIGS. 3A-3I.

If the user device 102 determines, in operation 220, that the input for generating the hyperlink is not received, the method 200 can return to operation 220. Thus, in some embodiments, the method 200 can pause at operation 220 until input for generating the hyperlink is received. If the user device 102 determines, in operation 220, that the input for generating the hyperlink is received, the method 200 can proceed to operation 222.

At operation 222, the user device 102 can generate the hyperlink. According to various embodiments, the user device 102 can generate the hyperlink by associating a path, a filename, a URL, a URI, or other resource identifier with text, files, or other information. For example, in some embodiments a user selects text within a document or other file and launches the hyperlink dialog 118. As such, operation 222 can include associating a resource identified in the method 200 with the selected text. It should be understood that this embodiment is illustrative, and should not be construed as being limiting in any way. From operation 222, the method 200 proceeds to operation 224. The method 200 ends at operation 224.

Referring now to FIG. 2B, additional aspects of the method 200 for presenting and interacting with a hyperlink dialog 118 are described in detail. In particular, as explained above with reference to FIG. 2A, FIG. 2B illustrates additional details of the method 200 that can be provided during execution of operation 218 described above. Because the functionality described herein with reference to FIG. 2B can be provided at other times, it should be understood that this embodiment is illustrative, and should not be construed as being limiting in any way.

In operation 226, the user device 102 can determine if the clipboard data 110 includes data formatted in a format associated with the selected tab. For example, if the selected tab corresponds to the quick type tab, the user device 102 may determine if the clipboard data 110 includes data formatted as a path, as a filename, or as a URL or URI such as a link formatted in the hypertext transfer protocol ("HTTP") format. Because various tabs can be configured to accept data in a variety of formats, it should be understood that these embodiments are illustrative, and should not be construed as being limiting in any way.

If the user device 102 determines, in operation 226, that the clipboard data 110 does not include data formatted in the format associated with the selected tab, the method 200 can return to operation 214, and the user device 102 can wait for input from the user. If the user device 102 determines, in operation 226, that the clipboard data 110 includes data formatted in the format associated with the selected tab, the method 200 proceeds to operation 228. In operation 228, the user device can enter the clipboard data 110 in the selected tab. Some example embodiments of populating a selected tab are described above and illustrated and described below with reference to FIGS. 3A-3I. From operation 228, the method 200 can proceed to operation 220, as explained in detail above with reference to FIG. 24.

Figure 3A:
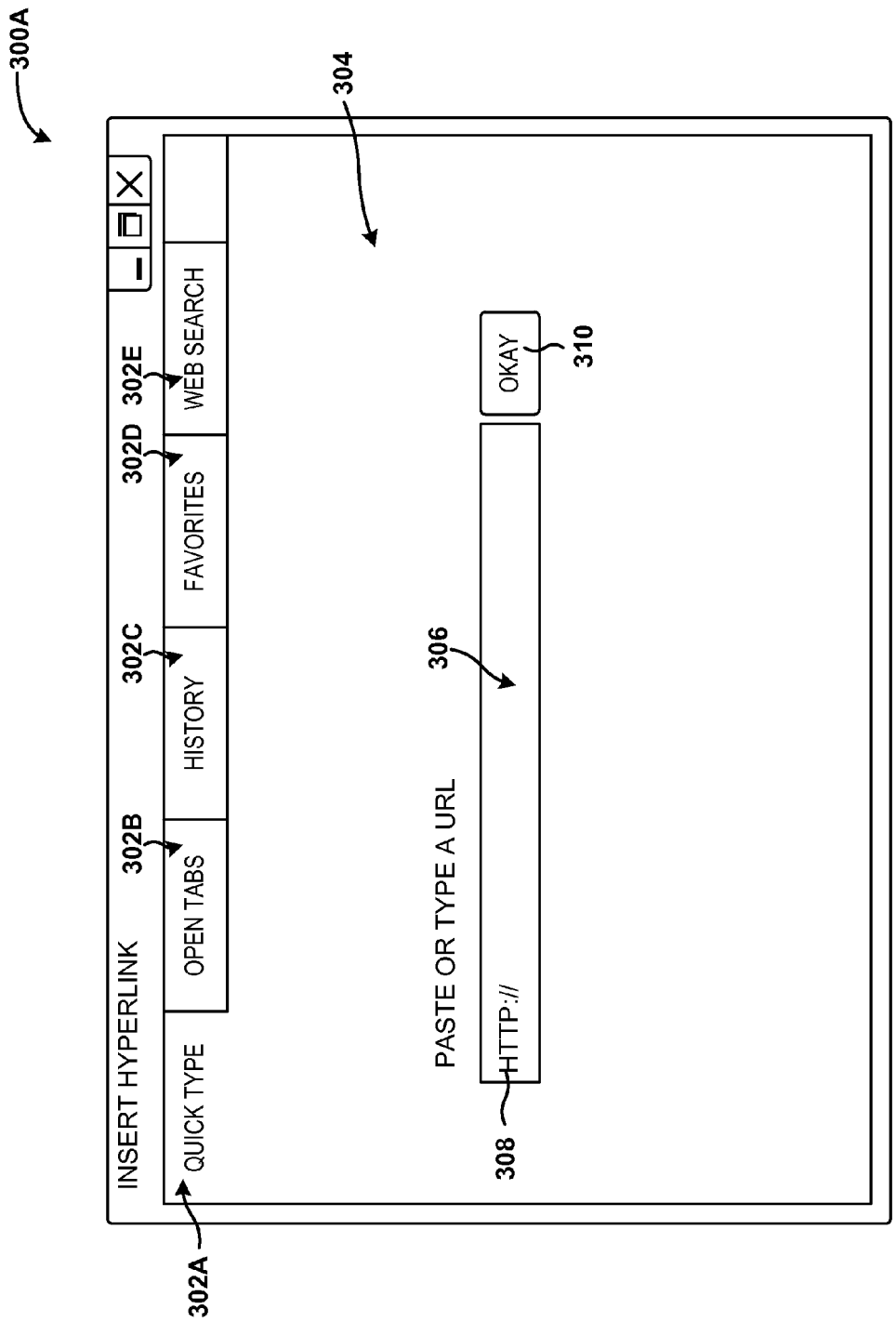
FIGS. 3A-3I are user interface diagrams showing aspects of user interfaces for presenting and interacting with a hyperlink dialog, according to various illustrative embodiments.

Turning now to FIGS. 3A-3I, user interface "UI" diagrams showing various aspects of the concepts and technologies disclosed herein for presenting and interacting with a hyperlink dialog will be described according to various illustrative embodiments. In particular, FIG. 3A shows a hyperlink dialog 3004 generated by the user device 102 and/or by the hyperlink module 116. It should be appreciated that the UI diagram illustrated in FIG. 3A is illustrative of one contemplated embodiment, and therefore should not be construed as being limited in any way.

As shown in FIG. 3A, the hyperlink dialog 3004 can be configured to present a number of UI soft buttons or controls 3024-E (hereinafter collectively and/or collectively referred to as "tab selectors 302"). The tab selectors 302 are selectable to select or switch a tab, interface page, or region that is to be presented by the hyperlink dialog 3004. While the hyperlink dialog 3004 is illustrated as including five tab selectors 302, it should be understood that this embodiment is illustrative, and should not be construed as being limiting in any way. In particular, other contemplated embodiments of the hyperlink dialog 3004 include other tab selectors 302 and associated tab interfaces. For example, some embodiments of the hyperlink dialog 3004 include a tab selector 302 for presenting a "bookmarks" tab, a "recently used files" tab, a "network locations" tab, and/or other tabs.

In the illustrated embodiment, the hyperlink dialog is presenting a quick type tab 304, which can be loaded by the user device 102 as a default tab, or can be selected or switched by the user via selection of the tab selector 3024. The illustrated embodiment should be understood as illustrative of one example, and should not be construed as being limiting in any way. The quick type tab 304 includes a data field 306 for entering text corresponding to a link, a resource, a file, a path, or other information for identifying a resource that is to be linked via the hyperlink dialog 300A. Because the creation of hyperlinks and the uses thereof are generally understood, the purposes and uses of the hyperlinks are not described in additional detail herein. In the illustrated embodiment, the data field 306 includes a prefix 308 that can be preloaded into the data field 306, if desired. While the illustrated prefix 308 indicates a hyperlink formatted as an HTTP address or identifier, it should be understood that this example is illustrative and should not be construed as being limiting in any way. In particular, the prefix 308 can be omitted and/or can be substituted with other prefixes, suffixes, or other text.

Figure 3B:
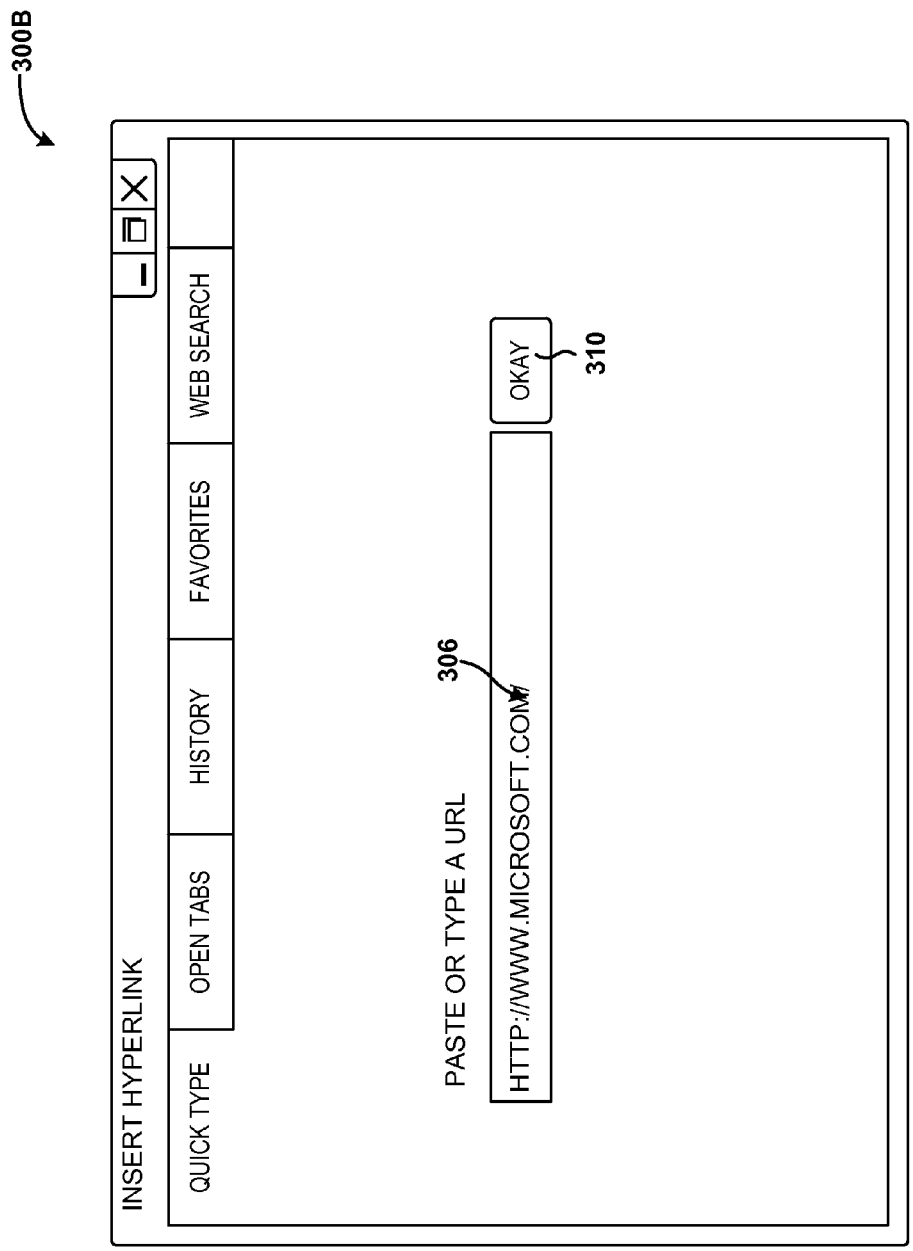

In some embodiments, the user device 102 is configured to analyze the clipboard data 110 to determine if any data is saved to a clipboard or other data storage location. These embodiments can be based upon an assumption that users sometimes copy text to a clipboard or other data storage location for use in the hyperlink dialog 300A. If the user device 102 identifies, in the clipboard data 110, any data formatted in the HTTP protocol or other protocol or format recognized as being associated with the quick type tab 304, the user device 102 can load the identified data into the data field 306. An example embodiment of loading clipboard data 110 into the data field 306 is illustrated in FIG. 3B. If the clipboard data 110 does not include such data, a user can enter text into the data field 306. The hyperlink dialog 300A also includes a UI control 310 for accepting the data typed or entered into the data field 306 as the hyperlink. It should be understood that this embodiment is illustrative, and should not be construed as being limiting in any way.

Figure 3C:
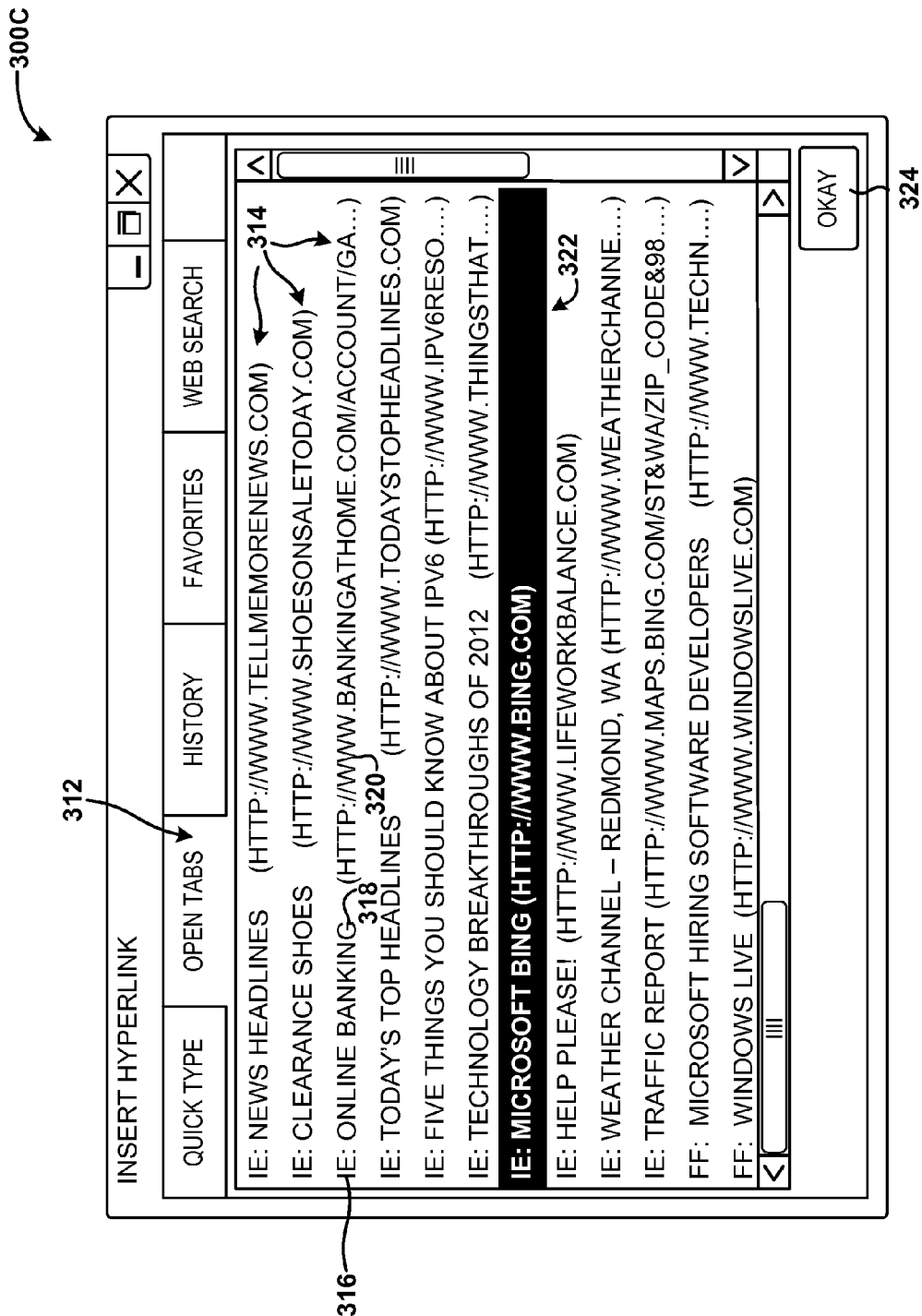

Referring now to FIG. 3C, a UI diagram showing additional aspects of the concepts and technologies disclosed herein for presenting and interacting with a hyperlink dialog is described in detail. In particular, FIG. 3C shows a hyperlink dialog 300C generated by the user device 102 and/or by the hyperlink module 116. As shown in FIG. 3C, an open tabs page or tab ("open tabs page") 312 is displayed. It should be understood that this embodiment is illustrative, and should not be construed as being limiting in any way.

The open tabs page 312 can include data indicating one or more sites, pages, applications, or other resources open in a tab or window of a web browser application ("open tabs") 314. The open tabs 314 can include browser application information 316, title information 318, and resource locator information 320. The browser application information 316 can indicate what browser application is being used to view the open tab 314. In some embodiments, the hyperlink dialog 300C is configured to present open tabs 314 for a single web browser application and/or not to indicate the browser application used to view the information associated with the open tabs 314. As such, various embodiments of the concepts and technologies disclosed herein can omit the browser application information 316.

The title information 318 can include a title of the resource associated with the open tabs 314. The title information 318 can be obtained by the user device 102 by viewing the source code of the resource associated with the open tab 314, by user input, and/or by other mechanisms. The resource locator information 320 can include a URI, a URL, a path, and/or other information identifying a location of the resource associated with the open tab 314. The hyperlink dialog 300C can be configured to present additional and/or alternative information. As such, the illustrated embodiment should be understood as being illustrative and should not be construed as being limiting in any way.

A user can select one of the open tabs 314 to associate with a hyperlink. In the illustrated embodiment, a user has selected one of the open tabs 314 and as such, the selected tab 322 is illustrated as being highlighted. By selecting the selected tab 322, the user can indicate that the information associated with the selected tab 322 is to be associated with text or other information as a hyperlink. The hyperlink dialog 300C can include a UI control 324 that, when selected, can create a hyperlink that includes the information associated with the selected tab 322. It should be understood that this embodiment is illustrative, and should not be construed as being limiting in any way.

Figure 3D:
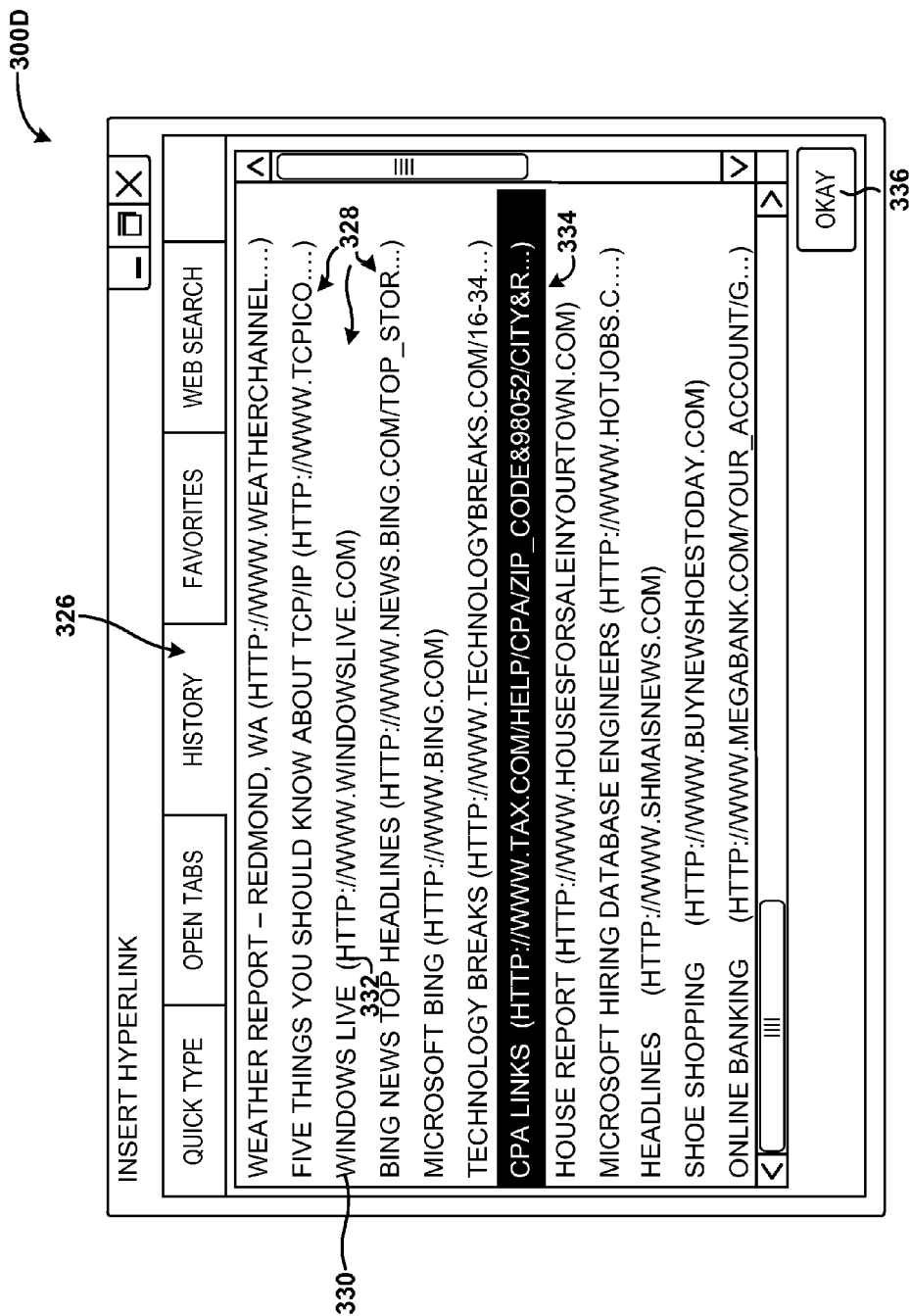

Referring now to FIG. 3D, a UI diagram showing additional aspects of the concepts and technologies disclosed herein for presenting and interacting with a hyperlink dialog is described in detail. In particular, FIG. 3D shows a hyperlink dialog 300D generated by the user device 102 and/or by the hyperlink module 116. As shown in FIG. 3D, a history tab or page ("history tab") 326 is displayed. It should be understood that this embodiment is illustrative, and should not be construed as being limiting in any way.

The history tab 326 can include data indicating one or more sites, pages, applications, or other resources that have been visited ("visited sites") 328. According to various embodiments, the visited sites 328 can include resources that have been visited by the user device 102. In other embodiments, the user device 102 can access a unified profile associated with the user, and can determine the visited sites 328 based upon resources visited by a number of devices. It should be understood that these embodiments are illustrative, and should not be construed as being limiting in any way.

The visited sites 328 can include title information 330 and resource locator information 332. According to some embodiments, the title information 330 and the resource locator information 332 can be similar or even identical to the title information 318 and the resource locator information 320 described above with reference to FIG. 3C. The hyperlink dialog 300D can be configured to present additional and/or alternative information. As such, the illustrated embodiment should be understood as being illustrative and should not be construed as being limiting in any way.

A user can select one of the visited sites 328 to associate with a hyperlink. In the illustrated embodiment, a user has selected one of the visited sites 328 and as such, the selected visited site 334 is illustrated as being highlighted. By selecting the selected visited site 334, the user can indicate that the information associated with the selected visited site 334 is to be associated with text or other information as a hyperlink. The hyperlink dialog 300D can include a UI control 336 that, when selected, can create a hyperlink that includes the information associated with the selected visited site 334, it should be understood that this embodiment is illustrative, and should not be construed as being limiting in any way.

Figure 3E:
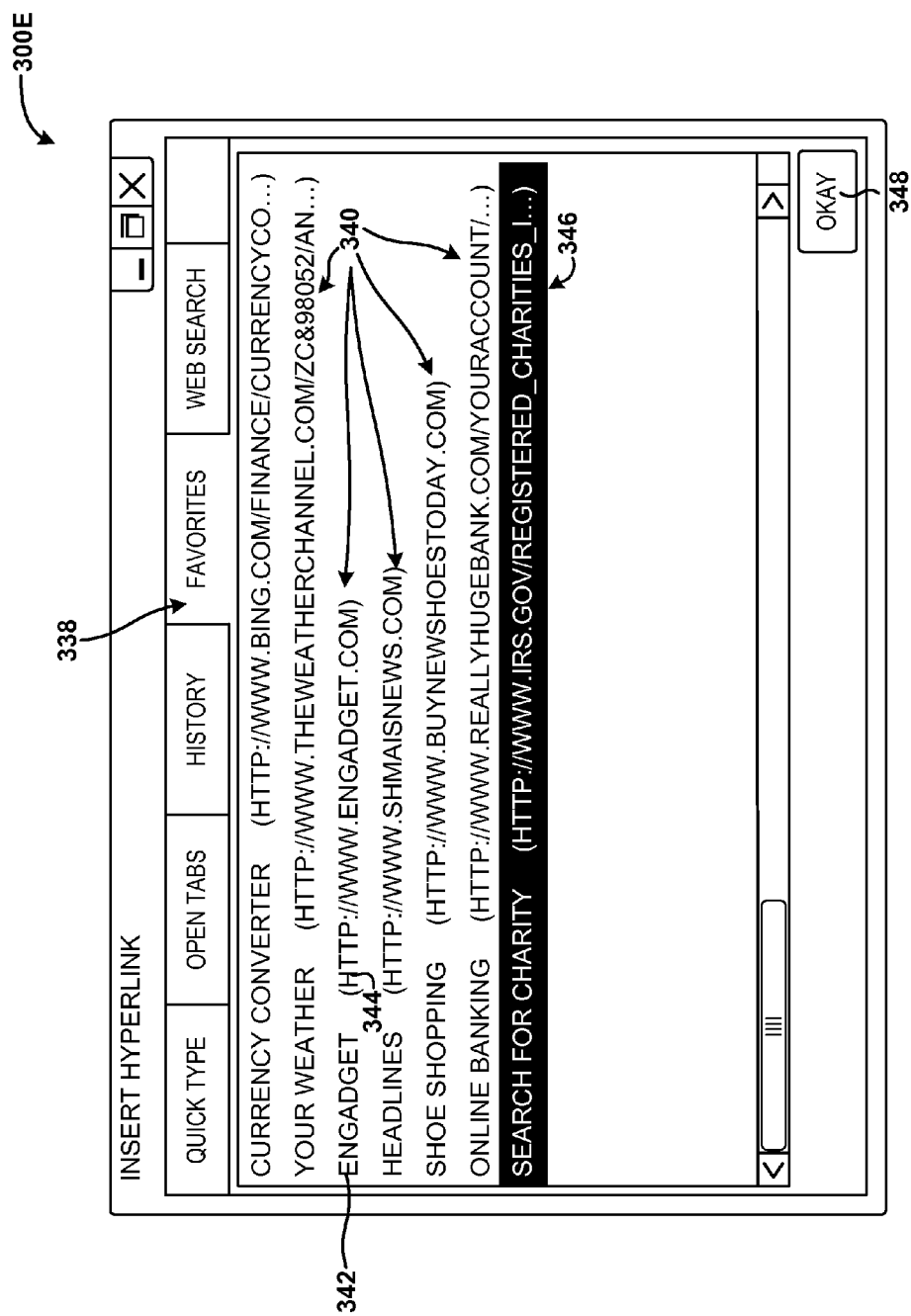

Referring now to FIG. 3E, a UI diagram showing additional aspects of the concepts and technologies disclosed herein for presenting and interacting with a hyperlink dialog is described in detail. In particular, FIG. 3E shows a hyperlink dialog 300E generated by the user device 102 and/or by the hyperlink module 116. As shown in FIG. 3E, a favorites tab or page ("favorites tab") 338 is displayed. It should be understood that this embodiment is illustrative, and should not be construed as being limiting in any way.

The favorites tab 338 can include data indicating one or more sites, pages, applications, or other resources that have been indicated by a user as favorites ("favorites") 340. According to some embodiments, the user device 102 can store a favorites file that includes the favorites 340, which can be stored as part of the application data 112 and/or as a separate file. The favorites 340 can include title information 342 and resource locator information 344. According to some embodiments, the title information 342 and the resource locator information 344 can be similar or even identical to the title information and/or the resource locator information described above with reference to FIGS. 3C-3D. The hyperlink dialog 300E can be configured to present additional and/or alternative information. As such, the illustrated embodiment should be understood as being illustrative and should not be construed as being limiting in any way.

A user can select one of the favorites 340 to associate with a hyperlink. In the illustrated embodiment, a user has selected one of the favorites 340 and as such, the selected favorite 346 is illustrated as being highlighted. By selecting the selected favorite 346, the user can indicate that the information associated with the selected favorite 346 is to be associated with text or other information as a hyperlink. The hyperlink dialog 300E can include a UI control 348 that, when selected, can create a hyperlink that includes the information associated with the selected favorite 346. It should be understood that this embodiment is illustrative, and should not be construed as being limiting in any way.

In some embodiments, the ability to use a favorites the or other list of favorites 340 can encourage users or other entities to maintain an updated list of favorites and/or commonly-visited sites, pages, or other resources. Thus, some embodiments of the concepts and technologies disclosed herein encourage users to update favorites such that the updated list of favorites can be used in other applications and/or for other purposes not described herein. It should be understood that this embodiment is illustrative, and should not be construed as being limiting in any way.

Figure 3F:
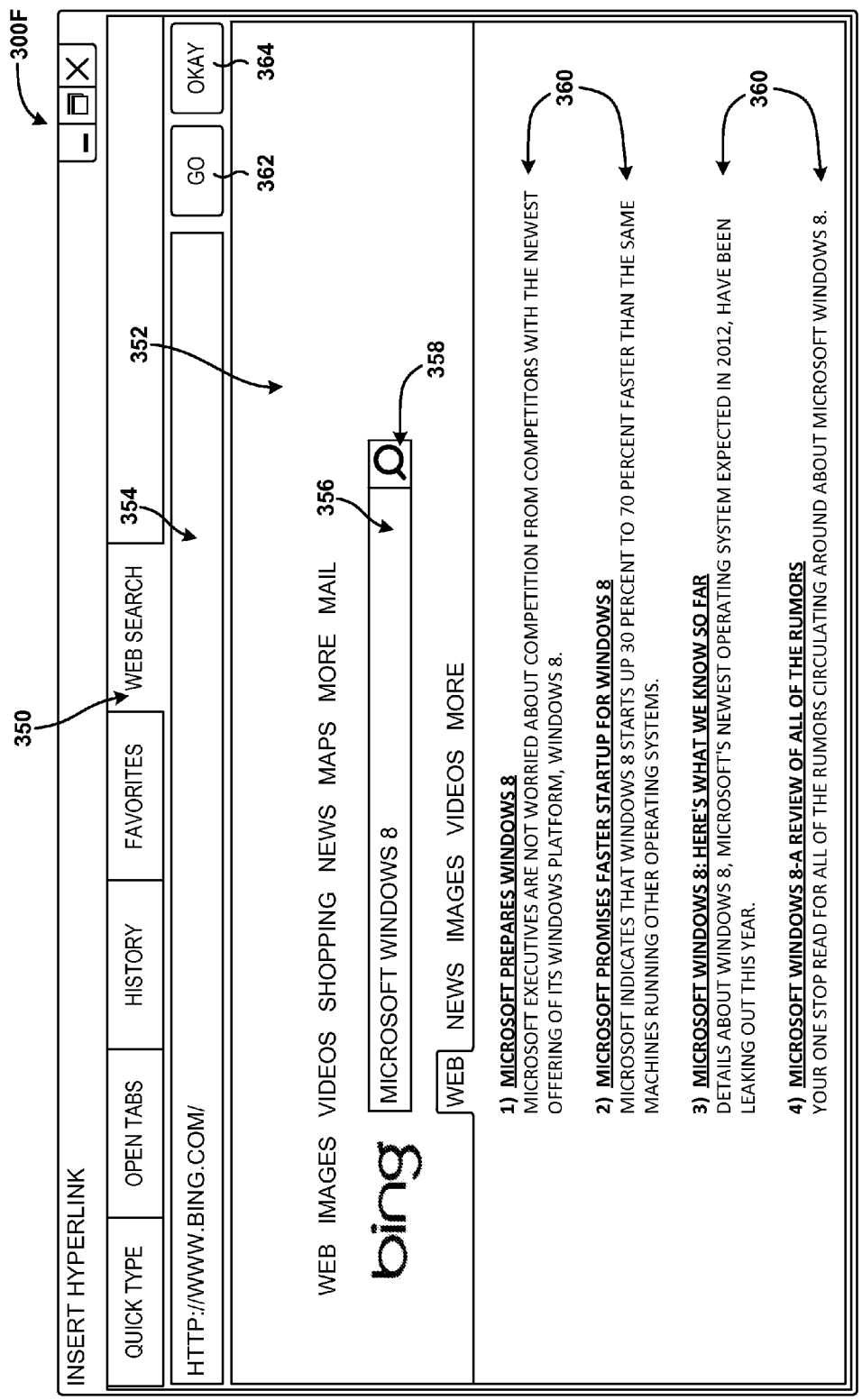

Referring now to FIG. 3F, a UI diagram showing additional aspects of the concepts and technologies disclosed herein for presenting and interacting with a hyperlink dialog is described in detail. In particular, FIG. 3F shows a hyperlink dialog 300F generated by the user device 102 and/or by the hyperlink module 116. As shown in FIG. 3F, a web search tab or page ("web search tab") 350 is displayed. It should be understood that this embodiment is illustrative, and should not be construed as being limiting in any way.

The web search tab 350 can include a search page 352 for searching the Internet, an intranet, and/or other locations. The web search tab 350 and/or the search page 352 can further include an address bar 354 for entering, copying, pasting, and/or displaying resource location information such as a URI, a URL, a path, or the like. The search page 352 also can include a search field 356 for executing a query or other search terminology, as well as a UI control 358 for entering the query. As shown in FIG. 3F, the search page 352 can present one or more search results 360 that can correspond to one or more sites, pages, applications, or other resources that have been identified in response to execution of the search query entered into the search field 356. The illustrated layout and format of the search results 360 is illustrative and should not be construed as being limiting in any way.

A user can enter a search query into the search field 356, select the UI control 358 or other functionality for executing the query, and the search results 360 can be presented in response to completing the query. As explained above with reference to FIGS. 1-2B, text selected in a document or other file such as the selected text 114 or other application data 112, can be used as default text fir the search query, in some embodiments. In other embodiments, the user enters the search query into the search field 356 as described herein. As such, the illustrated embodiment should be understood as being illustrative and should not be construed as being limiting in any way.

The hyperlink dialog 300F further can include a UI control 362 that, when selected, can obtain a resource associated with or located at the address or path entered into the address bar 354. The hyperlink dialog 300F also can include a UI control 364 that, when selected, creates a hyperlink that includes the information in the address bar 354. In the embodiment shown in FIG. 3F, the web address "http://www.bing.com/" is displayed in the address bar 354. In the illustrated embodiment, selection of the web search tab 350 prompts the user device 102 to load a search page associated with the BING searching service from Microsoft Corporation in Redmond, Wash. Because other searching services can be loaded upon selection of the web search tab 350, and because the web search tab 350 can be loaded without loading a search engine of any kind, it should be understood that this embodiment is illustrative, and should not be construed as being limiting in any way.

Figure 3G:
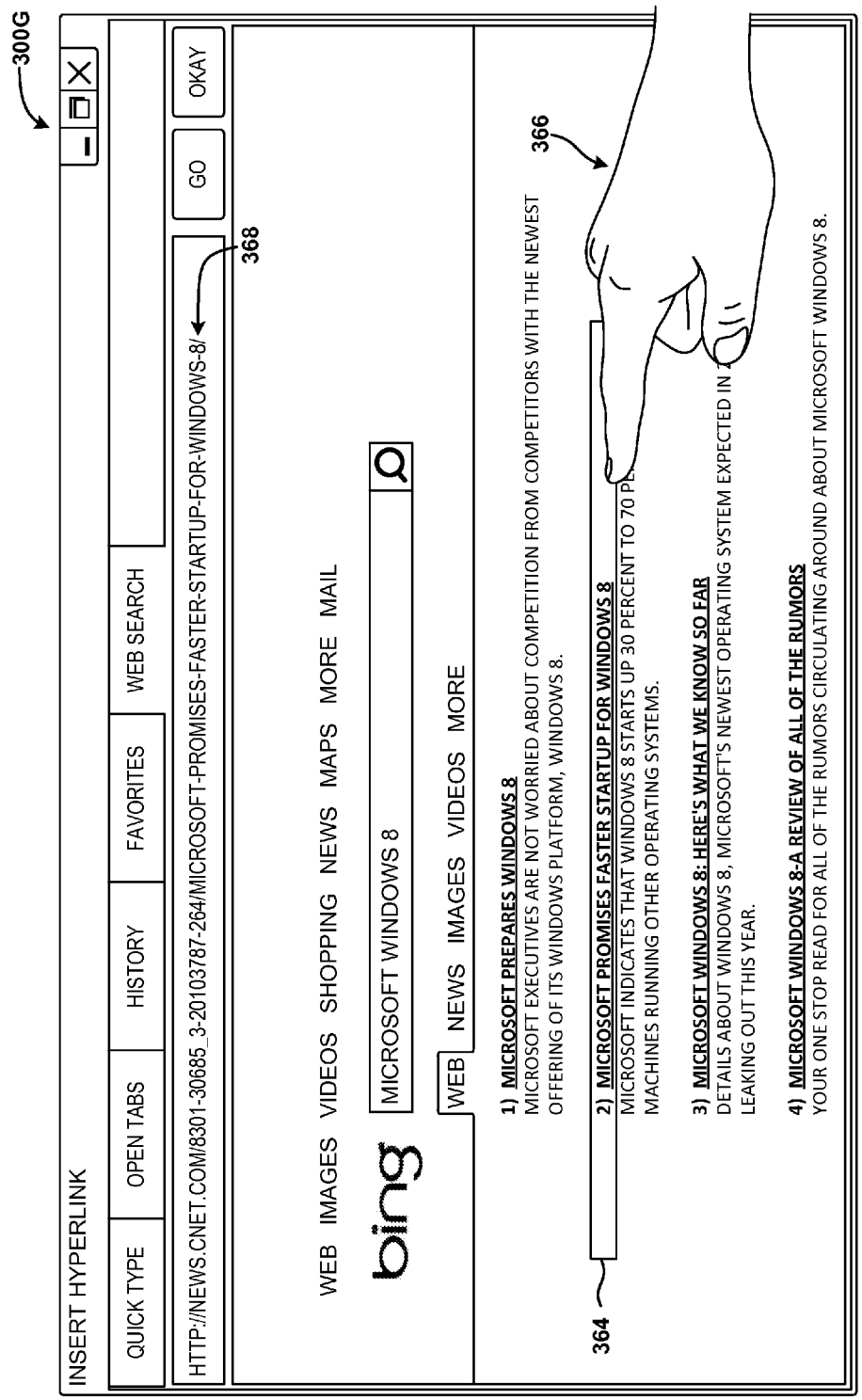

Referring now to FIG. 3G, a UI diagram showing additional aspects of the web search tab 350 are described in detail. In particular, FIG. 3G shows how a user can select one of the search results 360 displayed in the search page 352. In the embodiment shown in FIG. 3G, the user has selected the selected search result 364 using a hand 366. As such, it can be appreciated that embodiments of the concepts and technologies disclosed herein support interactions with touch-based input devices. Other methods of input are contemplated and are possible. For example, the user can interact with the user device 102 using touch gestures, multi-touch gestures, input devices such as mice and keyboards, key strokes, voice commands, or other input mechanisms. As such, it should be understood that the illustrated embodiment is illustrative, and should not be construed as being limiting in any way.

Figure 3H:
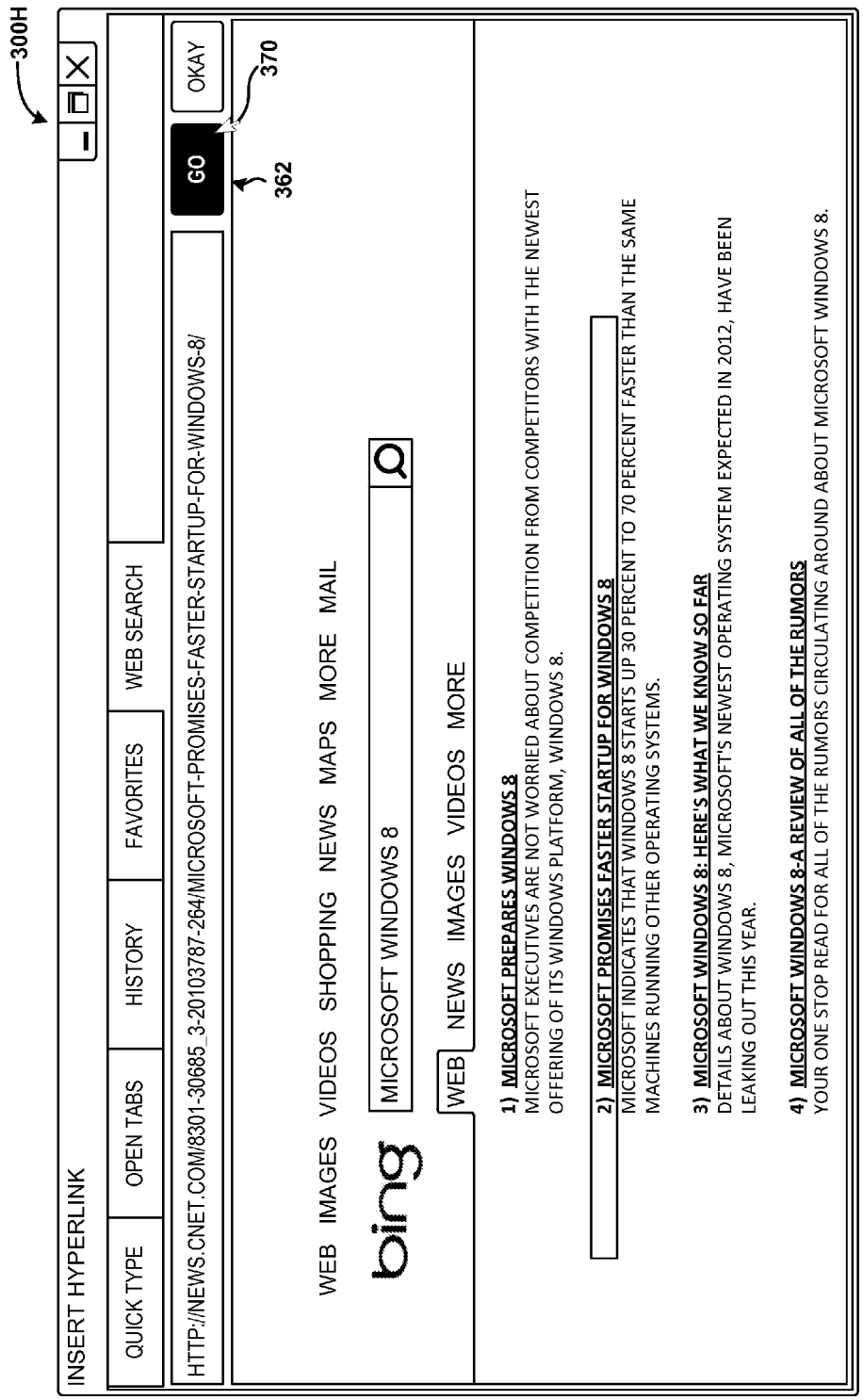

As shown in FIG. 3G, selection of the selected result 364 by the user can result in the user device 102 loading the URI, URL, path, or other information ("URI") 368 into the address bar 354. As shown in FIG. 3H, the user device 102 can be configured to load the URI 368 in the address bar 354 in response to selection of the selected result 364 by the user. In the embodiment illustrated in FIG. 3H, the user also can enter a command to navigate to the resource identified by the URI 368, for example, by clicking on the UI control 362 with a mouse pointer 370, it should be understood that this embodiment is illustrative, and should not be construed as being limiting in any way.

Figure 3I:
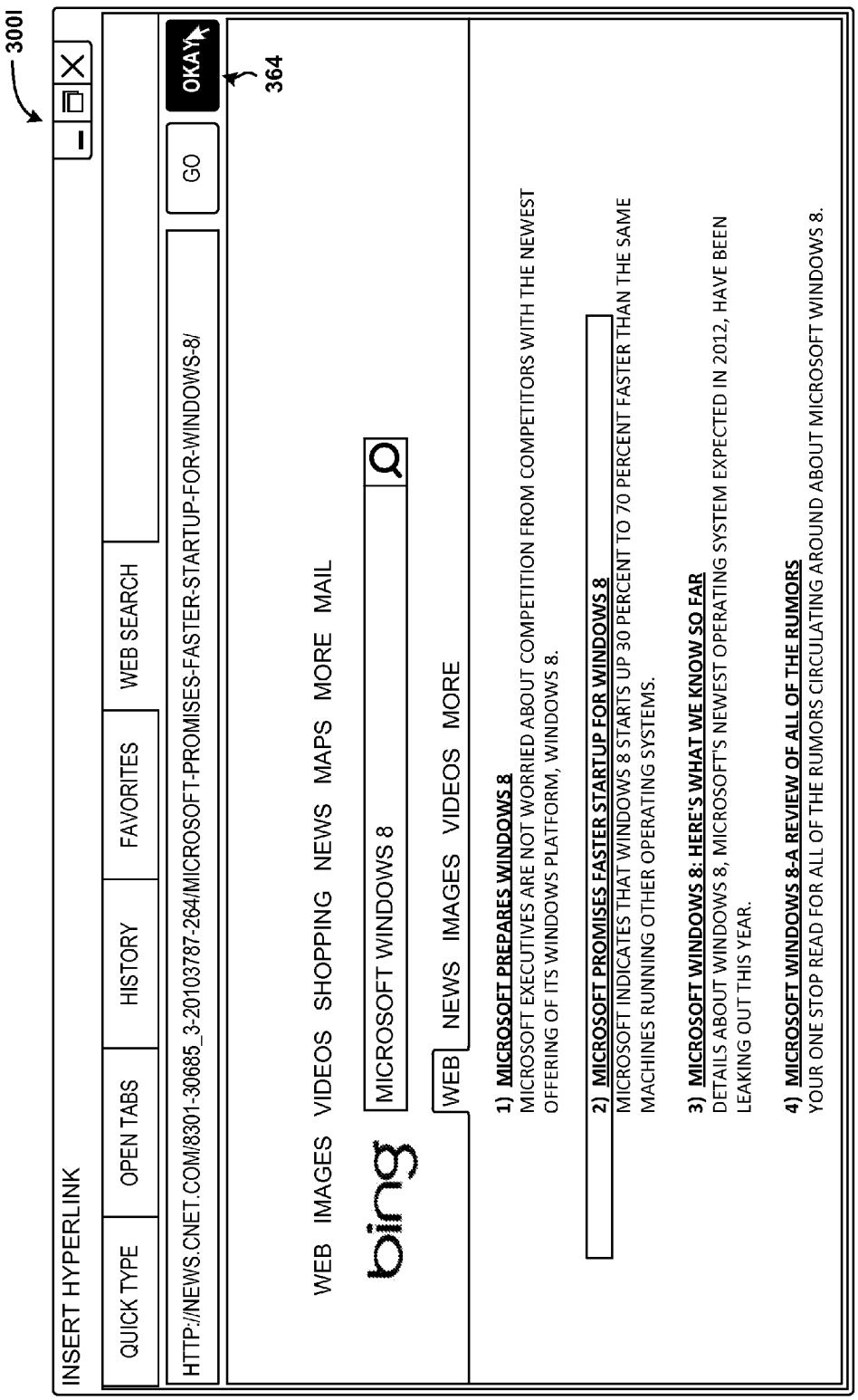

As shown in FIG. 3I, the user can select the UI control 364 to create a hyperlink that includes the information in the address bar 354 such as the URI 368. Thus, embodiments of the web search tab 350 can be used by a user to search various locations and/or networks, to navigate to a site or other resource associated with a search result, and to create a hyperlink with information for accessing the identified resource. It should be understood that this embodiment is illustrative, and should not be construed as being limiting in any way.

Figure 4:
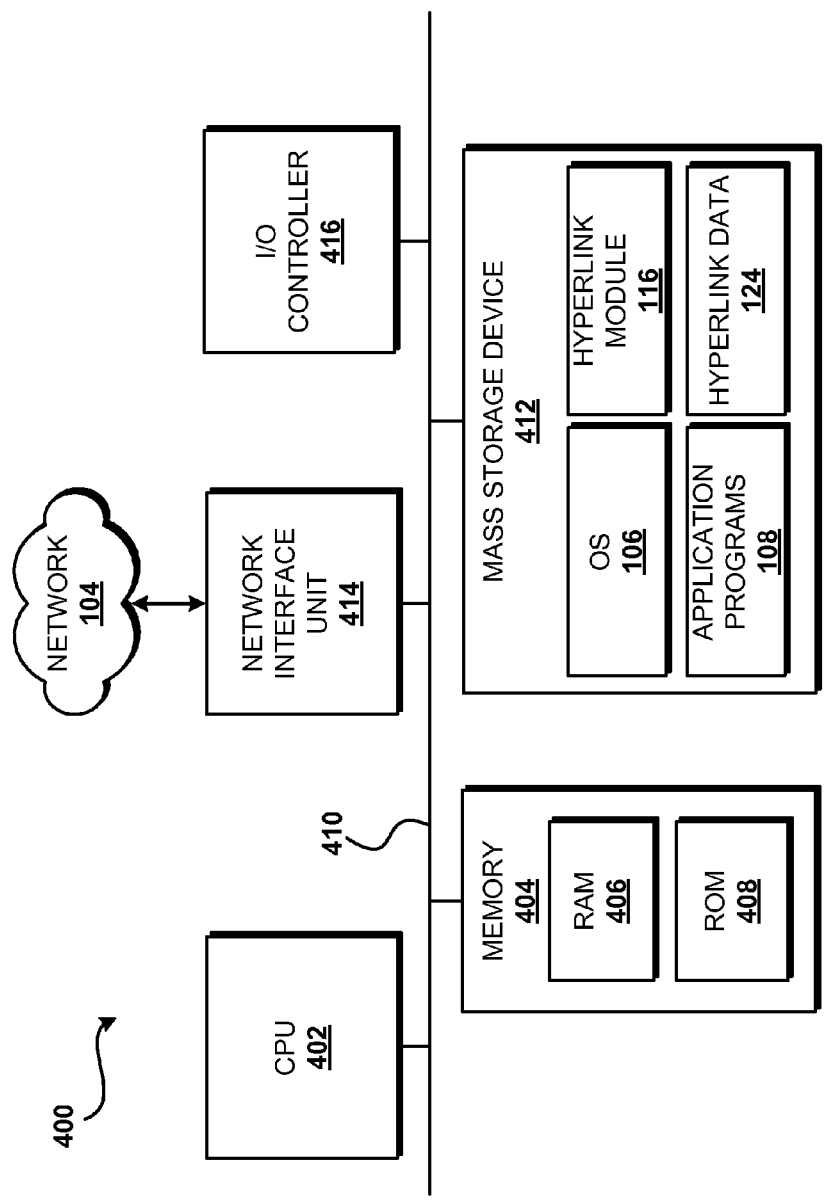
FIG. 4 is a computer architecture diagram illustrating an illustrative computer hardware and software architecture for a computing system capable of implementing aspects of the embodiments presented herein.

FIG. 4 illustrates an illustrative computer architecture 400 for a device capable of executing the software components described herein for presenting and interacting with a hyperlink dialog. Thus, the computer architecture 400 illustrated in FIG. 4 illustrates an architecture for a server computer, a mobile phone, a PDA, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 106, the application programs 108, and the hyperlink module 116. Although not shown in FIG. 4, the mass storage device 412 also can be configured to store the clipboard data 110, the application data 112, the selected data 114, the web data 120, the hyperlink data 124, and/or other data, if desired.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, the computer architecture 400 may operate in a networked environment using logical connections to remote computers through a network such as the network 104. The computer architecture 400 may connect to the network 104 through a network interface unit 414 connected to the bus 410. It should be appreciated that the network interface unit 414 also may be utilized to connect to other types of networks and remote computer systems, for example, the web server 122. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as (primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Figure 5:
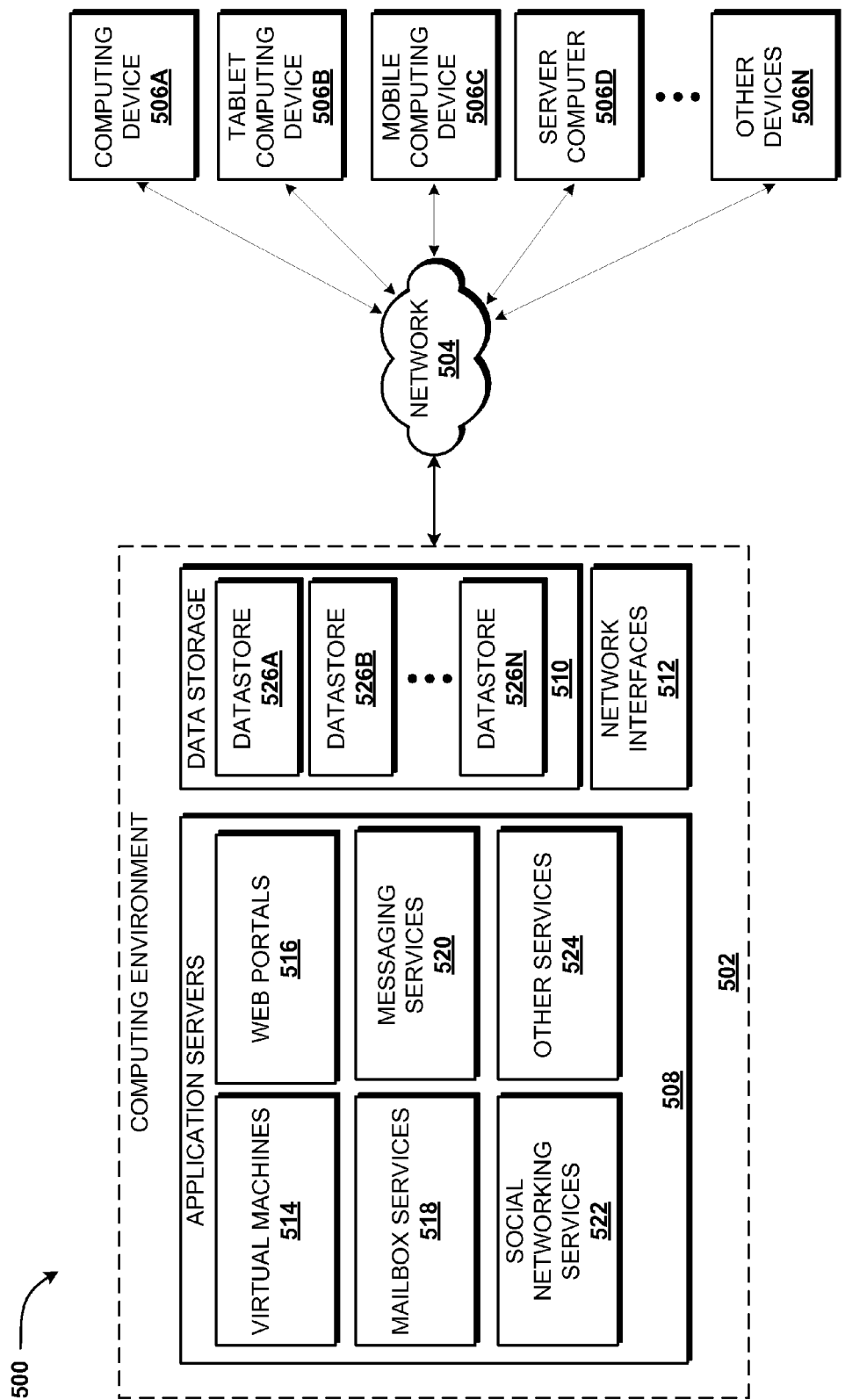
FIG. 5 is a diagram illustrating a distributed computing environment capable of implementing aspects of the embodiments presented herein.

FIG. 5 illustrates an illustrative distributed computing environment 500 capable of executing the software components described herein for presenting and interacting with a hyperlink dialog. Thus, the distributed computing environment 500 illustrated in FIG. 5 can be used to provide the functionality described herein with respect to the user device 102 and/or the hyperlink module 116 executed by the user device 102. The distributed computing environment 500 thus may be utilized to execute any aspects of the software components presented herein.

According to various implementations, the distributed computing environment 500 includes a computing environment 502 operating on, in communication with, or as part of the network 504. The network 504 also can include various access networks. According to various implementations, the functionality of the network 504 can be provided by the network 104 illustrated in FIGS. 1 and 4. One or more client devices 506A-506N (hereinafter referred to collectively and/or generically as "clients 506") can communicate with the computing environment 502 via the network 504 and/or other connections (not illustrated in FIG. 5). In the illustrated embodiment, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502. Two example computing architectures for the clients 506 are illustrated and described herein with reference to FIGS. 4 and 6. It should be understood that the illustrated clients 506 and computing architectures illustrated and described herein are illustrative, and should not be construed as being limited in any way.

In the illustrated embodiment, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, virtual machines, portals, and/or other resources. In the illustrated embodiment, the application servers 508 host one or more virtual machines 514 for hosting applications or other functionality. According to various implementations, the virtual machines 514 host one or more applications and/or software modules for providing the functionality described herein for presenting and interacting with a hyperlink dialog. It should be understood that this embodiment is illustrative, and should not be construed as being limiting in any way. The application servers 508 also host or provide access to one or more Web portals, link pages, Web sites, and/or other information ("Web portals") 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

The application servers 508 also can include one or more social networking services 522. The social networking services 522 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 522 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 522 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 522 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 522 are not mentioned herein for the sake of brevity. As such, the above embodiments are illustrative, and should not be construed as being limited in any way.

As shown in FIG. 5, the application servers 508 also can host other services, applications, portals, and/or other resources ("other services") 524. The other services 524 can include, but are not limited to, a hyperlink service that can be provided by execution of the hyperlink module 116 described above and/or the various services or applications such as those provided by the application programs 108 described above. It thus can be appreciated that the computing environment 502 can provide integration of the concepts and technologies disclosed herein provided herein for presenting and interacting with a hyperlink dialog with various mailbox, messaging, social networking, and/or other services or resources. For example, the concepts and technologies disclosed herein can be used to generate hyperlinks for status updates in social networking applications, for generating realtime messages with hyperlinks or links, for generating hyperlinks and/or embedding other information in mail messages, or the like.

As mentioned above, the computing environment 502 can include the data storage 510. According to various implementations, the functionality of the data storage 510 is provided by one or more databases operating on, or in communication with, the network 504. The functionality of the data storage 510 also can be provided by one or more server computers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the application servers 508 and/or other data. Although not illustrated in FIG. 5, the datastores 526 also can host or store the clipboard data 110, the application data 112, the selected data 114, the hyperlink dialog 118, the web data 120, the hyperlink data 124, and/or other data, if desired.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the clients 506. It should be understood that the clients 506 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 500 to utilize the functionality described herein for presenting and interacting with a hyperlink dialog.

Figure 6:
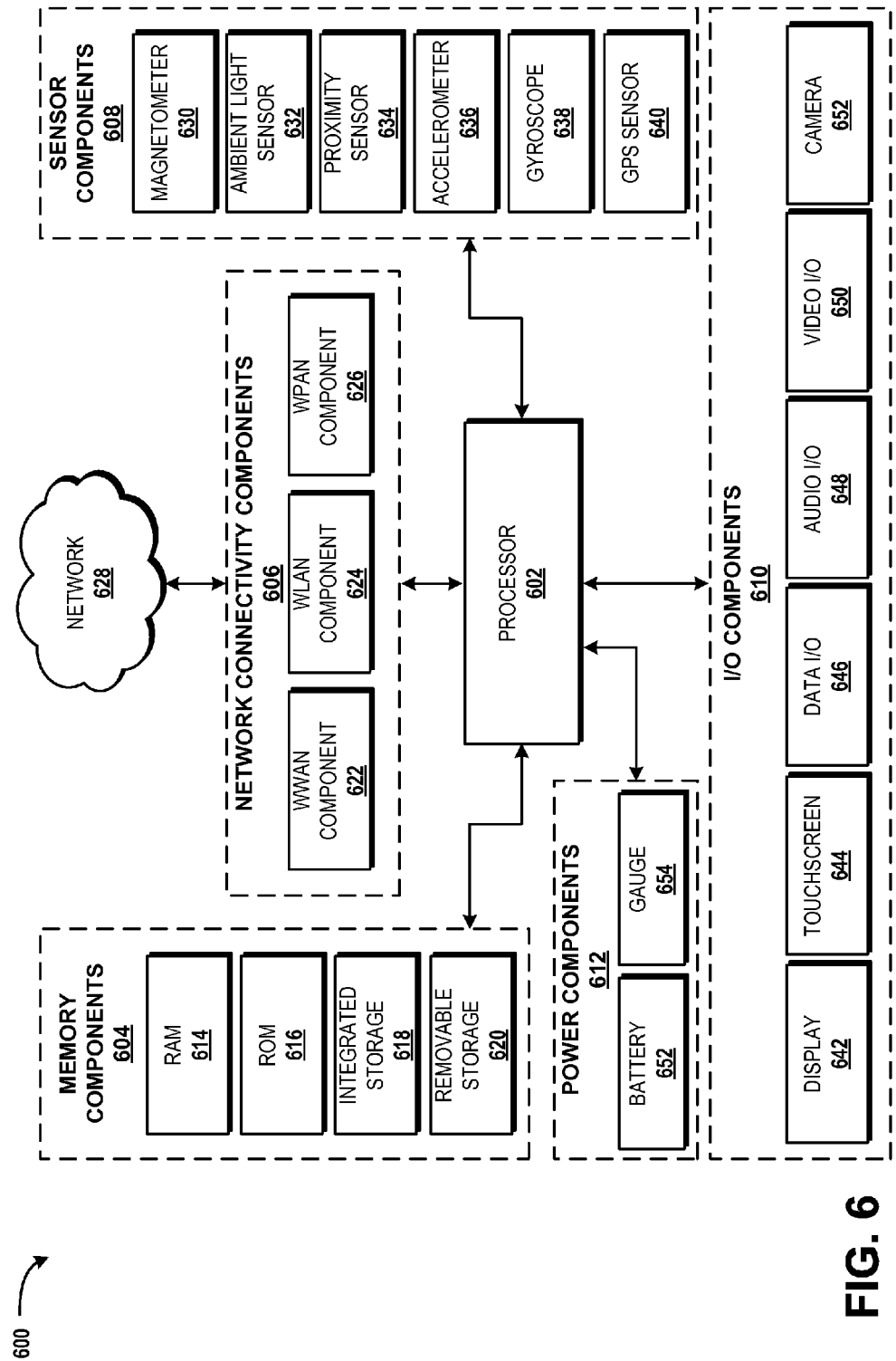
FIG. 6 is a computer architecture diagram illustrating a computing device architecture capable of implementing aspects of the embodiments presented herein.

Turning now to FIG. 6, an illustrative computing device architecture 600 for a computing device that is capable of executing various software components described herein for presenting and interacting with a hyperlink dialog. The computing device architecture 600 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 600 is applicable to any of the clients 606 shown in FIG. 5. Furthermore, aspects of the computing device architecture 600 may be applicable to traditional desktop computers, portable computers (e.g., laptops, notebooks, ultra-portables, and netbooks), server computers, and other computer systems, such as described herein with reference to FIG. 4. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 604, network connectivity components 606, sensor components 608, input/output components 610, and power components 612. In the illustrated embodiment, the processor 602 is in communication with the memory components 604, the network connectivity components 606, the sensor components 608, the input/output ("I/O") components 610, and the power components 612. Although no connections are shown between the individuals components illustrated in FIG. 6, the components can interact to carry out device functions. In some embodiments, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some embodiments, the processor 602 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 602 is configured to communicate with a discrete CPU (not shown). In any case, the CPU and GPU may be configured in accordance with a co-processing CPU/GPU computing model, wherein the sequential part of an application executes on the CPU and the computationally-intensive part is accelerated by the CPU.

In some embodiments, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some embodiments, the processor 602 is fabricated, in part, utilizing a package-on-package ("PoP") integrated circuit packaging technique. Moreover, the processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some embodiments, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some embodiments, the RAM 614 or a portion thereof, the ROM 616 or a portion thereof, and/or some combination the RAM 614 and the ROM 616 is integrated in the processor 602. In some embodiments, the ROM 616 is configured to store a firmware, an operating system or a portion thereof (e.g., operating system kernel), and/or a bootloader to load an operating system kernel from the integrated storage 618 or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some embodiments, the removable storage 620 is provided in lieu of the integrated storage 618. In other embodiments, the removable storage 620 is provided as additional optional storage. In some embodiments, the removable storage 620 is logically combined with the integrated storage 618 such that the total available storage is made available and shown to a user as a total combined capacity of the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research in Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from a network 628, which may be a WWAN, a WLAN, or a WPAN. Although a single network 628 is illustrated, the network connectivity components 606 may facilitate simultaneous communication with multiple networks. For example, the network connectivity components 606 may facilitate simultaneous communications with multiple networks via one or more of a WWAN, a WLAN, or a WPAN. In some embodiments, the network 628 is provided by the networks 104, 504. In some embodiments, the network 628 includes the networks 104, 504. In other embodiments, the network 628 provides access to the networks 104, 504.

The network 628 may be a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("GDMA") ONE, CDMA2000, Universal Mobile Telecommunications System ("UMTS"), Long Term Evolution ("LTE"), and Worldwide Interoperability for Microwave Access ("WiMAX"). Moreover, the network 628 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed. Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 628 may be configured to provide voice and/or data communications with any combination of the above technologies. The network 628 may be configured to or adapted to provide voice and/or data communications in accordance with future generation technologies.

In some embodiments, the WWAN component 622 is configured to provide dual-multi-mode connectivity to the network 628. For example, the WWAN component 622 may be configured to provide connectivity to the network 628, wherein the network 628 provides service via GSM and UNITS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 628 may be a VI/LAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 624 is configured to connect to the network 628 via the WI-FI access points. Such connections may be secured via various encryption technologies including, but not limited, WI-FI Protected Access ("WPA"), WPA2, Wired Equivalent Privacy ("WEP"), and the like.

The network 628 may be a WPAN operating in accordance with Infrared Data Association ("IrDA"), BLUETOOTH, wireless Universal Serial Bus ("USB"), Z-Wave, ZIGBEE, or some other shaft-range wireless technology. In some embodiments, the WPAN component 626 is configured to facilitate communications with other devices, such as peripherals, computers, or other computing devices via the WPAN.

The sensor components 608 include a magnetometer 630, an ambient light sensor 632, a proximity sensor 634, an accelerometer 636, a gyroscope 638, and a Global Positioning System sensor ("GPS sensor") 640. It is contemplated that other sensors, such as, but not limited to, temperature sensors or shock detection sensors, also may be incorporated in the computing device architecture 600.

The magnetometer 630 is configured to measure the strength and direction of a magnetic field. In some embodiments the magnetometer 630 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 630 are contemplated.

The ambient light sensor 632 is configured to measure ambient light. In some embodiments, the ambient light sensor 632 provides measurements to an application program stored within one the memory components 604 in order to automatically adjust the brightness of a display (described below) to compensate for low-tight and highlight environments. Other uses of measurements obtained by the ambient light sensor 632 are contemplated.

The proximity sensor 634 is configured to detect the presence of an object or thing in proximity to the computing device without direct contact. In some embodiments, the proximity sensor 634 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 634 are contemplated.

The accelerometer 636 is configured to measure proper acceleration. In some embodiments, output from the accelerometer 636 is used by an application program as an input mechanism to control some functionality of the application program. For example, the application program may be a video game in which a character, a portion thereof, or an object is moved or otherwise manipulated in response to input received via the accelerometer 636. In some embodiments, output from the accelerometer 636 is provided to an application program for use in switching between landscape and portrait modes, calculating coordinate acceleration, or detecting a fall. Other uses of the accelerometer 636 are contemplated.

The gyroscope 638 is configured to measure and maintain orientation. In some embodiments, output from the gyroscope 638 is used by an application program as an input mechanism to control some functionality of the application program. For example, the gyroscope 638 can be used for accurate recognition of movement within a 3D environment of a video game application or some other application. In some embodiments, an application program utilizes output from the gyroscope 638 and the accelerometer 636 to enhance control of some functionality of the application program. Other uses of the gyroscope 638 are contemplated.

The GPS sensor 640 is configured to receive signals from GPS satellites for use in calculating a location. The location calculated by the UPS sensor 640 may be used by any application program that requires or benefits from location information. For example, the location calculated by the UPS sensor 640 may be used with a navigation application program to provide directions from the location to a destination or directions from the destination to the location. Moreover, the UPS sensor 640 may be used to provide location information to an external location-based service, such as E911 service. The UPS sensor 640 may obtain location information generated via WI-FI, WIMAX, and/or cellular triangulation techniques utilizing one or more of the network connectivity components 606 to aid the GPS sensor 640 in obtaining a location fix. The UPS sensor 640 may also be used in Assisted UPS ("A-UPS") systems.

The I/O components 610 include a display 642, a touchscreen 644, a data I/O interface component ("data I/O") 646, an audio I/O interface component ("audio I/O") 648, a video I/O interface component ("video I/O") 650, and a camera 652. In some embodiments, the display 642 and the touchscreen 644 are combined. In some embodiments two or more of the data I/O component 646, the audio I/O component 648, and the video I/O component 650 are combined. The I/O components 610 may include discrete processors configured to support the various interface described below, or may include processing functionality built-in to the processor 602.

The display 642 is an output device configured to present information in a visual form. In particular, the display 642 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 642 is a liquid crystal display ("LCD") utilizing any active or passive matrix technology and any backlighting technology (if used). In some embodiments, the display 642 is an organic light emitting diode ("OLED") display. Other display types are contemplated.

The touchscreen 644 is an input device configured to detect the presence and location of a touch. The touchscreen 644 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 644 is incorporated on top of the display 642 as a transparent layer to enable a user to use one or more touches to interact with objects or other information presented on the display 642. In other embodiments, the touchscreen 644 is a touch pad incorporated on a surface of the computing device that does not include the display 642. For example, the computing device may have a touchscreen incorporated on top of the display 642 and a touch pad on a surface opposite the display 642.

In some embodiments, the touchscreen 644 is a single-touch touchscreen. In other embodiments, the touchscreen 644 is a multi-touch touchscreen. In some embodiments, the touchscreen 644 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 644. As such, a developer may create gestures that are specific to a particular application program.

In some embodiments, the touchscreen 644 supports a tap gesture in which a user taps the touchscreen 644 once on an item presented on the display 642. The tap gesture may be used for various reasons including, but not limited to, opening or launching whatever the user taps. In some embodiments, the touchscreen 644 supports a double tap gesture in which a user taps the touchscreen 644 twice on an item presented on the display 642. The double tap gesture may be used for various reasons including, but not limited to, zooming in or zooming out in stages. In some embodiments, the touchscreen 644 supports a tap and hold gesture in which a user taps the touchscreen 644 and maintains contact for at least a pre-defined time. The tap and hold gesture may be used for various reasons including, but not limited to, opening a context-specific menu.

In some embodiments, the touchscreen 644 supports a pan gesture in which a user places a finger on the touchscreen 644 and maintains contact with the touchscreen 644 while moving the finger on the touchscreen 644. The pan gesture may be used for various reasons including, but not limited to, moving through screens, images, or menus at a controlled rate. Multiple finger pan gestures are also contemplated. In some embodiments, the touchscreen 644 supports a flick gesture in which a user swipes a finger in the direction the user wants the screen to move. The flick gesture may be used for various reasons including, but not limited to, scrolling horizontally or vertically through menus or pages. In some embodiments, the touchscreen 644 supports a pinch and stretch gesture in which a user makes a pinching motion with two fingers (e.g., thumb and forefinger) on the touchscreen 644 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or Objects such as styluses may be used to interact with the touchscreen 644. As such, the above gestures should be understood as being illustrative and should not be construed as being limiting in any way.

The data I/O interface component 646 is configured to facilitate input of data to the computing device and output of data from the computing device. In some embodiments, the data I/O interface component 646 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 648 is configured to provide audio input and/or output capabilities to the computing device. In some embodiments, the audio I/O interface component 646 includes a microphone configured to collect audio signals. In some embodiments, the audio I/O interface component 646 includes a headphone jack configured to provide connectivity for headphones or other external speakers. In some embodiments, the audio interface component 648 includes a speaker for the output of audio signals. In some embodiments, the audio I/O interface component 646 includes an optical audio cable out.

The video I/O interface component 650 is configured to provide video input and/or output capabilities to the computing device. In some embodiments, the video I/O interface component 650 includes a video connector configured to receive video as input from another device (e.g., a video media player such as a DVD or BLURAY player) or send video as output to another device (e.g., a monitor, a television, or some other external display). In some embodiments, the video I/O interface component 650 includes a High-Definition Multimedia Interface ("HDMI"), mini-HDMI, micro-HDMI, DisplayPort, or proprietary connector to input/output video content. In some embodiments, the video I/O interface component 650 or portions thereof is combined with the audio I/O interface component 648 or portions thereof.

The camera 652 can be configured to capture still images and/or video. The camera 652 may utilize a charge coupled device ("CCD") or a complementary metal oxide semiconductor ("CMOS") image sensor to capture images. In some embodiments, the camera 652 includes a flash to aid in taking pictures in low-light environments. Settings for the camera 652 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 652, which can be connected to a battery gauge 654. The batteries 652 may be rechargeable or disposable. Rechargeable battery types include, but are not limited to, lithium polymer, lithium ion, nickel cadmium, and nickel metal hydride. Each of the batteries 652 may be made of one or more cells.

The battery gauge 654 can be configured to measure battery parameters such as current, voltage, and temperature. In some embodiments, the battery gauge 654 is configured to measure the effect of a battery's discharge rate, temperature, age and other factors to predict remaining life within a certain percentage of error. In some embodiments, the battery gauge 654 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via a power I/O component (not shown).

Based on the foregoing, it should be appreciated that technologies for presenting and interacting with a hyperlink dialog have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A computer-implemented method for presenting a hyperlink dialog, the computer-implemented method comprising performing computer-implemented operations for:
    prior to presenting the hyperlink dialog, requesting data, at an application program for creating an electronic document, executing at the user device, from a web browser application executing at the user device;
    determining, prior to presenting the hyperlink dialog, from the requested data, one or more existing open tabs being executed in the web browser application;
    in response to determining one or more existing open tabs, receiving the data indicating one or more existing open tabs at the application program for creating an electronic document;
    populating the hyperlink dialog with the data associated with the one or more existing open tabs;
    presenting, at a user device, the hyperlink dialog within the application program for creating an electronic document, the hyperlink dialog comprising a first tab corresponding to an open tabs page comprising the data associated with the one or more existing open tabs in the web browser application and a second tab corresponding to a search tab, selection of the second tab causing presentation of a search field for receiving input for executing an internet query within the hyperlink dialog;
    receiving a selection of the first tab corresponding to the open tabs page from a user of the user device;
    in response to receiving the selection of the first tab selector, presenting the open tabs page in the hyperlink dialog presented within the application program for creating the electronic document without switching the user to the web browser application;
    receiving a selection of the data in the open tabs page indicating an existing open tab in the web browser from the user; and
    generating, at the user device, a hyperlink for inclusion in the electronic document based upon the data selected in the open tabs page.

2. The method of claim 1, wherein the hyperlink dialog further comprises a third tab corresponding to a favorites tab comprising resources indicated as favorites by an entity associated with the user device and wherein the method further comprises:
    receiving a selection of the third tab;
    in response to receiving the selection, presenting the favorites tab; and
    generating, at the user device, a hyperlink based upon data selected in the favorites tab.

3. The method of claim 1, wherein the hyperlink dialog further comprises a fourth tab corresponding to a quick type tab comprising a data field for entering text for identifying a resource that is to be hyperlinked and wherein the method further comprises:
    receiving a selection of the fourth tab;

in response to receiving the selection, presenting the quick type tab;

determining if clipboard data is stored at the user device when the hyperlink dialog is presented;

in response to determining that the clipboard data is not stored at the user device, obtaining the data via the hyperlink dialog; and in response to determining that the clipboard data is stored at the user device, determining if the clipboard data is stored in a format associated with the quick type tab, in response to determining that the clipboard data is stored in the format associated with the quick type tab, populating the quick type tab with at least a portion of the clipboard data, and generating the hyperlink based upon the at least a portion of the clipboard data.

4. The method of claim 1 wherein the method further comprises:

receiving a selection of the second tab;

in response to receiving the selection of the second tab, presenting the search field;

determining if clipboard data is stored at the user device when the hyperlink dialog is presented;

in response to determining the clipboard data is stored at the user device;

determining if the clipboard data is stored in a format associated with the search tab; and in response to determining the clipboard data is stored in a format associated with the search tab, populating the search field with at least a portion of clipboard data.

5. A computer storage medium having computer readable instructions stored thereupon that, when executed by a computer, cause the computer to:

prior to presenting a hyperlink dialog, request data, at an application program for creating an electronic document, executing at the user device, from a web browser application executing at the user device;

determine, prior to presenting the hyperlink dialog, from the requested data, one or more existing open tabs being executed in the web browser application;

in response to determining one or more existing open tabs, receive the data indicating one or more existing open tabs at the application program for creating an electronic document;

populate the hyperlink dialog with the data associated with the one or more existing open tabs;

present the hyperlink dialog within the application program for creating an electronic document the hyperlink dialog comprising a plurality of tabs, a first tab being selectable to display an open tabs page comprising the data associated with the one or more existing open tabs within the web browser application executing at a user device and a second tab being selectable to display a data field for receiving input;

receive a selection of the first tab or the second tab from a user of the computer;

in response to receiving the selection of the first tab, present the open tabs page in the hyperlink dialog presented within the application program for creating the electronic document without switching the user to the web browser application, or, in response to receiving the selection of the second tab, present the data field for receiving input;

if the selection corresponds to the open tabs page, receive a selection of the data in the open tabs page indicating an existing open tab in the web browser from the user, or, if the selection corresponds to the second tab, receive an input in the data field from the user and perform a search query based, at least in part, on the input; and generate, at the computer, a hyperlink for inclusion in the electronic document based upon the data selected in the open tabs page or data generated by the search query.

6. The computer storage medium of claim 5 further comprising computer readable instructions that, when executed by the computer, cause the computer to:

receive a selection of the second tab;

in response to receiving the selection, present the data field;

determine if clipboard data is stored at the computer when the hyperlink dialog is presented;

in response to determining that the clipboard data is stored at the computer, determine that the clipboard data is stored in a format associated with the data field; and populate the data field with at least a portion of the clipboard data.

7. The computer storage medium of claim 5, the plurality of tabs further comprising a quick type tab selectable to display a data field for entering text for identifying a resource that is to be hyperlinked and further comprising computer readable instructions that, when executed by the computer, cause the computer to:

receive a selection of the quick type tab;

in response to receiving the selection, present the data field;

determine if clipboard data is stored at the computer when the hyperlink dialog is presented;

in response to determining that the clipboard data is stored at the computer, determine if the clipboard data is stored in a format associated with the quick type tab; and in response to determining the clipboard data is stored in the format associated with the quick type tab, populate the data field with at least a portion of the clipboard data, and generate the hyperlink based upon the at least the portion of the clipboard data.

8. A computer storage medium having computer readable instructions stored thereupon that, when executed by a computer, cause the computer to:

prior to presenting a hyperlink dialog, request data, at an application program for creating an electronic document, executing at the user device, from a web browser application executing at the user device;

determine, prior to presenting the hyperlink dialog, from the requested data, at least one of favorites information or one or more existing open tabs being executed in the web browser application;

in response to determining at least one of favorites information or one or more existing open tabs, receive the data indicating favorites information or data indicating one or more existing open tabs at the application program for creating an electronic document;

populate the hyperlink dialog with the data associated with the one or more existing open tabs or favorites information;

present the hyperlink dialog within the application program for creating an electronic document the hyperlink dialog comprising a plurality of tabs, a first tab of the plurality of tabs comprising a search tab that, upon selection, presents a field for receiving a text input, the text input being used to execute a query;

upon selection of a second tab of the plurality of tabs by a user of the computer, present the data associated with the at least one of favorites information or information associated with an existing open tab within the web browser without switching the user to the web browser;

determine if clipboard data is stored at the computer when the hyperlink dialog is presented;

populate the hyperlink dialog, upon selection of a third tab by the user, with a fillable tab filled with at least a portion of the clipboard data, in response to determining that the clipboard data is stored at the computer;

present the first tab, the second tab, or the third tab as a default tab when the hyperlink dialog is loaded;

receive a selection of one of the plurality of tabs; and generate, at the computer, a hyperlink for inclusion in the electronic document based upon data received via the one of the plurality of tabs.

9. The computer storage medium of claim 8, wherein presenting the hyperlink dialog comprises presenting the plurality of tabs and respective identifiers associated with the plurality of tabs, the identifiers comprising a quick type tab identifier, an open tabs page identifier, a favorites tab identifier, a history tab identifier, and a search tab identifier.

10. The computer storage medium of claim 9, further comprising computer readable instructions that, when executed by the computer, cause the computer to:

receive a selection of the search tab via the search tab identifier; and populate the search tab with at least a portion of data selected in an application program.

11. The computer storage medium of claim 8, further comprising computer readable instructions that, when executed by the computer, cause the computer to provid the hyperlink to a client device in communication with the computer.

12. The method of claim 1, the method further comprising:

receiving a selection of the second tab;

in response to receiving the selection of the second tab, presenting data associated with the search tab; and generating, at the user device, a hyperlink based upon data selected in the search tab.

13. The computer storage medium of claim 5, further comprising computer readable instructions that, when executed by the computer, cause the computer to:

in response to receiving the selection of the second tab, present data associated with the search tab; and upon performing the search query, generate, at the computer, a hyperlink based upon data selected in the search tab.

14. The computer storage medium of claim 5, wherein the hyperlink dialog includes a history tab comprising a tab for accessing visited resources and further comprising computer readable instructions that, when executed by the computer, cause the computer to:

receive a selection of the history tab;

in response to receiving the selection of the history tab, present the history tab; and generate, at the computer, a hyperlink based upon data selected in the history tab.

15. The computer storage medium of claim 5, wherein the dialog hyperlink includes a favorites tab comprising resources indicated as favorites by an entity associated with the user device, and further comprising computer readable instructions that, when executed by the computer, cause the computer to:

receive a selection of the favorites tab;

in response to receiving the selection of the favorites tab, present a visual representation of the favorites; and generate, at the computer, a hyperlink based upon data selected in the favorites tab.

16. The method of claim 1, further comprising providing the hyperlink to a client device in communication with the user device.

17. The computer storage medium of claim 5, further comprising computer readable instructions that, when executed by the computer, cause the computer to provide the hyperlink to a client device in communication with the computer.

18. The computer storage medium of claim 9, further comprising computer readable instructions that, when executed by the computer, cause the computer to:

present the selected tab in response to receiving the selection of the selected tab; and generate, at the computer, a hyperlink based upon data received in the selected tab.

19. The computer storage medium of claim 9, wherein populating the third tab of the plurality of tabs with at least a portion of the clipboard data comprises:

determine if the clipboard data is stored in a format associated with the selected tab when the hyperlink dialog is presented; and in response to determining that the clipboard data is stored in a format associated with the selected tab, populate the selected tab with at least the portion of the clipboard data, and generate, at the computer, a hyperlink based upon at least the portion of the clipboard data.

20. The method of claim 1, further comprising navigating to a site from the search tab in the hyperlink dialog.

* * * * *